US008875082B1

(12) United States Patent
Sircar et al.

(10) Patent No.: US 8,875,082 B1
(45) Date of Patent: Oct. 28, 2014

(54) SYSTEM AND METHOD FOR DETECTING AND PRESCRIBING PHYSICAL CORRECTIONS FOR TIMING VIOLATIONS IN PRUNED TIMING DATA FOR ELECTRONIC CIRCUIT DESIGN DEFINED BY PHYSICAL IMPLEMENTATION DATA

(71) Applicant: Cadence Design Systems, Inc., San Jose, CA (US)

(72) Inventors: Sourav Kumar Sircar, Uttar Pradesh (IN); Manish Garg, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/729,665

(22) Filed: Dec. 28, 2012

(51) Int. Cl.
G06F 9/455 (2006.01)
G06F 17/50 (2006.01)

(52) U.S. Cl.
CPC .................................. G06F 17/5068 (2013.01)
USPC ........... 716/134; 716/110; 716/113; 716/119; 716/132

(58) Field of Classification Search
USPC ........................................................ 716/134
See application file for complete search history.

(56) References Cited

U.S. PATENT DOCUMENTS

2006/0277512 A1* 12/2006 Kucukcakar et al. ............. 716/6
2009/0172608 A1* 7/2009 Hopkins et al. ................... 716/1
2012/0131525 A1* 5/2012 Oh et al. ......................... 716/108

* cited by examiner

Primary Examiner — Vuthe Siek
Assistant Examiner — Eric Lee
(74) Attorney, Agent, or Firm — Rosenberg, Klein & Lee

(57) ABSTRACT

A system and method for expeditious operational timing signoff of a circuit design through a timing analysis and subsequent corrective or remedial optimization is performed with the goal of correlating timing between the physical implementation corrective optimizer module and the timing analysis module to reduce iterations therebetween. A physical optimizer in the correction module is imparted with knowledge of the physical implementation of the design to allow for legal, non-conflicting placement of corrective buffers or resizing of gates in accordance with the physical implementation data of the circuit design.

24 Claims, 23 Drawing Sheets

As seen by signoff engine when G1 is resized to G1'

Actual hold violation change = ΔD$_1$ + ΔD$_2$ + ΔD$_3$
as seen by signoff engine = 50 + 10 + 10 = 70ps As seen by optimizer when G1 resized to G1'

Hold vio change seen by optimizer = 55 + 10 + 10 = 75ps
So, error introduced by optimizer = 5ps only

SYSTEM AND METHOD FOR DETECTING AND PRESCRIBING PHYSICAL CORRECTIONS FOR TIMING VIOLATIONS IN PRUNED TIMING DATA FOR ELECTRONIC CIRCUIT DESIGN DEFINED BY PHYSICAL IMPLEMENTATION DATA

BACKGROUND OF THE INVENTION

The present invention is generally directed to Electronic Design Automation (EDA) for creating integrated circuit products such as, for example, system on chip (SOC) products and the like. More specifically, the present invention is directed to providing expeditious timing signoff verification and correction for a physical circuit design.

While signoff systems and methods are known, such heretofore known systems and methods are encumbered by numerous deficiencies not the least of which are required repeated iterations between timing signoff and physical implementation, wildly divergent timing analyses between timing signoff and physical implementation, inordinate turn around time, untenable storage, processing, and memory requirements, and severely truncated, non-comprehensive analyses.

There is therefore a need for a system and method for expeditious timing signoff for detecting and responsively prescribing physical correction for timing violations in an electronic circuit design defined by physical implementation data.

SUMMARY OF THE INVENTION

It is an object of the present invention to provide a system and method for timing signoff for detecting and responsively prescribing physical corrections for timing violations in an electronic circuit design defined by physical implementation data. It is a further object to provide improved correlation between a signoff timing analysis module and a physical implementation module to reduce repeated iterations therebetween and provide expeditious timing signoff thereby. It is a further object to provide a selective reduction in timing data according to both data-type and regional-based according to detected violations to expedite physical implementation optimization thereof.

These and other objects are attained in the system and method for detecting and responsively prescribing physical corrections for timing violations in an electronic circuit design defined by physical implementation data.

The disclosed system for detecting and responsively prescribing physical corrections for timing violations in an electronic circuit design defined by physical implementation data includes a timing analysis module receiving and analyzing the physical implementation data and operational timing according to a plurality of predefined operational views thereof. The timing analysis module identifies a defective portion of the physical implementation data responsive to detection of an operational timing defect in any of the operational views. The timing analysis module generates timing data including, for the operational views, the identification of each of the defective portions detected therein. A data reduction module is coupled to the timing analysis module. The data reduction module defines, for each defective portion, a region of the physical implementation data potentially impacted by corrective action thereon. The data reduction module selectively extracts a portion of the timing data corresponding to each region of the physical implementation to generate reduced timing data. A correction module is coupled to the data reduction module to execute an optimization engine on the reduced timing data and prescribe for each operational timing defect a corrective physical modification upon a corresponding one of the regions of physical implementation data. The correction module generates a change order including the corrective physical modification for updated physical implementation of the electronic circuit design.

A timing signoff method for detecting and responsively prescribing physical corrections for timing violations in an electronic circuit design defined by physical implementation data includes establishing a timing analysis module executable to receive and analyze the physical implementation data and operational timing according to a plurality of predefined operational views thereof. The timing analysis module executes to identify a defective portion of the physical implementation data responsive to detection of an operational timing defect in any of the operational views. The timing analysis module generates timing data, including for the operational views, the identification of each of the defective portions detected therein. A data reduction module is coupled to the timing analysis module. The data reduction module executes to define, for each defective portion, a region of the physical implementation data potentially impacted by corrective action thereon. The data reduction module executes to selectively extract a portion of the timing data corresponding to each region of the physical implementation to generate reduced timing data. A correction module is established coupled to the data reduction module to execute an optimization engine on the reduced timing data and prescribe for each operational timing defect a corrective physical modification upon a corresponding one of the regions of physical implementation data. The correction module generates a change order including the corrective physical modification for updating physical implementation of the electronic circuit design.

A method for detecting and responsively transforming a circuit design defined by physical implementation data to implement physical corrections for detected violations in the circuit design includes establishing at least one processor coupled to a memory, the memory including physical implementation data for a circuit design. A timing analysis is executed in at least one processor to receive and analyze the physical implementation data in operational timing according to a plurality of predefined operational views thereof. The timing analysis identifies a defective portion of the circuit design responsive to detection of an operational timing defect in any of the operational views. The timing analysis generates timing data including an identification of each defective portion detected therein. Data reduction is executed to define for each defective portion, a region of the circuit design, potentially impacted by corrective action thereon. The data reduction selectively extracts a portion of the timing data corresponding to each region of the circuit design to generate reduced timing data. A corrective optimization is executed on the reduced timing data to implement a corrective physical modification to the circuit design for each operational timing defect.

Additional aspects and details will be set forth in the Description which follows and, in part, will be apparent from the Description and Figures.

DETAILED DESCRIPTION OF THE PREFERRED EMBODIMENTS

Figure 1:
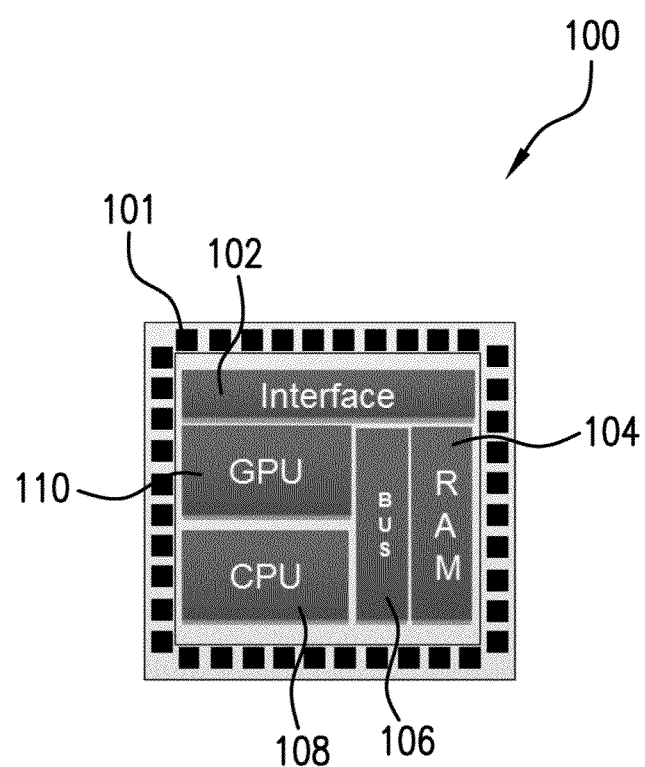
FIG. 1 is a block diagram of an exemplary circuit design representing a processor-based system on chip (SOC)

The subject system and method provide for expeditious timing signoff in an Electronic Design Automation (EDA) flow for detecting and responsively prescribing physical corrections for timing violations in an electronic circuit design defined by physical implementation data. Such system and method for expeditious verification and correction of a circuit design through a timing analysis and subsequent corrective or remedial optimization is performed with the goal of correlating timing between a physical implementation corrective optimizer module and a timing analysis module to reduce iterations therebetween. The physical optimizer in the correction module is imparted with knowledge of the physical implementation of the design to allow for ab initio legal, non-conflicting physical corrections to the design in accordance with the physical implementation data thereof.

A system and method formed in accordance with certain embodiments of the present invention generally provide for expedited signoff of a circuit design which minimizes recursive loops between a circuit timing signoff and a physical implementation of an electronic design automation flow. Additionally, the system and method yield enhanced timing correlation between the timing signoff and physical implementation, whereby the heightened accuracy of timing during signoff is reflected in corrective updates to physical implementation. The system and method provide for efficient signoff processing for circuit timing data subject to wide ranges of operational conditions and modes by selectively reducing the processed data to remain within adaptively defined regions about detected violations within the physical implementation data of an electronic circuit design. The processing load for timing signoff is adaptively streamlined thereby to depend primarily on the extent of actual violations rather than on the size of the electronic circuit of the combinations of corners and modes it may be subject to.

An EDA flow traverses recursively through a plurality of stages towards the actual fabrication of complex integrated circuit devices, microchips, and systems. Device designs as small as a microcontroller in an alarm clock to devices as large as a very complex system on chip (SOC) including a plurality of cores coupled to an on chip memory and IO are extensively planned out, verified, and modified repeatedly to arrive at a fabricated tangible physical device. At first, an engineer or designer has an idea for a new circuit design or device; this idea is then mapped out into a logical schematic data defining a qualitative view of the functional goals of the device and interconnections amongst components thereof. For example, a terminal y of an OR logic gate O2 is coupled to a terminal b of an OR logic gate O3 and if the design receives an input A, then an output B should follow at a certain output.

A physical layout implementation stage builds upon such logical schematic abstraction of the design to generate data specifying how such logical schematic may actually be implemented physically. A physical layout is generated by placement and routing steps to include geometries and placement coordinates of components such as gates, buffers, registers, flip flops, and all manner of electrical integrated circuit structures along with routing interconnections between these components.

Further data abstractions such as a mask pattern which is the ultimate or final step prior to fabrication of the physical device embodying the circuit design may be included in the circuit design data as well. The totality of all of the physical implementation data abstractions plus extrinsic data may collectively define the circuit design.

The placement and routing steps allocate placement for these individual components on a semiconductor substrate with actual physical geometries and a physical coordinate mapped organization reflecting how the circuit design will be actually processed on the silicon substrate by optical lithography or other such fabrication measures. The routing portion seeks to interconnect each of the individual components to allow a signal to pass therethrough. Once a physical layout has been generated, a number of extensive verification checks and analyses are performed in a signoff stage to ensure that the physical implementation of both the idea and the logical design meet the design goals, rules, and constraints thereupon and functions as expected.

Signoff is generally accomplished by the performance of multiple static timing analyses (STA), amongst other tools, to determine the operational timing characteristics throughout the system design to ensure proper functionality. For example, given any input A, an output B should arrive at a certain time on an output of the design. Such signoff stage is generally extremely slow and time-consuming utilizing a large amount of data, processing resources, temporary storage resources, and large amounts of permanent storage resources. The signoff utilizing tools such as the static timing analysis and other such verification tools must be as close to 100% accurate and thorough as possible as they are the last practical chance to catch any possible violation under any possible operational and environmental conditions before vast resources are committed to physical fabrication of often very substantial quantities of the implemented design. Changes to a circuit design after fabrication has commenced may reach astronomically prohibitive cost and complexity and may indeed be impossible without substantial waste and retooling.

Electronic chips, integrated circuits, and systems of all varieties are approaching sizes and complexities never before seen and will continue to exponentially increase unabatedly into the foreseeable future. Gigascale designs already incorporate oftentimes hundreds of millions instances which each may have several to several tens of gates. For a simple example, 150 million logical gates may be arranged into one unified coherent system design. The data laying out the physical properties and operational characteristics such as timing of these gates and their interconnection can become massive—easily outstripping the capacity of available storage, memory, and processing systems. Hundreds of gigabytes, and even terra or petabytes of data space may oftentimes be required for a single design. Therefore, tools facilitating an EDA flow, such as, for example, a placement and routing physical implementation tool or signoff timing analysis tool may not be performed in total all at once by one processor, stored on one hard drive, or contained in a single machine's memory, but may, instead need to be broken up into a plurality of partitions to operate in massively parallel processing and storage system configurations to accomplish transformations and analyses thereupon within a reasonably acceptable time.

Generally, after a placement and routing design implementation stage has completed, a signoff engine takes the entirety of the design for such exhaustive verification thereof as discussed above. The signoff engines (and the placement and routing engines to a lesser extent as well) must determine whether the design will work in any and all operating conditions. There may be a range of factors affecting expected operating conditions, such as, for example: varying voltages, temperatures, substrate materials, fabrication process, and the like, that the actual physical chips may be expected to experience. Inasmuch as performing exhaustive analyses on each and every different mutation or permutation of the various factors would be untenable, generally several exemplary conditions of each factor that define a range, such as minimum, maximum, and typical value are each generally referred to as "corners." Such corners are utilized to simplify and make the processing and data requirements more manageable rather than every possible condition. Nonetheless, several hundred to thousand of these combinations of corners will generally be examined.

For a simplified example, a plurality of different voltages may be expected to be experienced within the system ranging anywhere from one volt to five volts. Rather than processing each independent discrete voltage or voltage gradients therebetween, the signoff engine may rely on the assumption of linearity and merely test the outer markers along with a typical value of the range—such as, for example, the one volt, three volts, and five volts, each as a corner condition. As another example, with regard to operating temperature, rather than verifying each step of expected temperatures along an operating range of say for example, negative 20 degrees to 130 degrees, the signoff engine may exercise just the negative 20, 80, and 120 degrees as corners.

Further complicating the placement and routing optimization and signoff stages are a plurality of operational modes for the design. Often times, a single design may have several to tens of different operational modes. For example, a first mode, zero, may be a test mode, whereas mode one may be an operating mode. Multiplying each of the modes by each of the corners including the temperature, voltage, and the like, arrives at a certain number of views, where a view is a certain corner matched with a certain mode. For example, operational mode 1 with voltage corner of 3 volts and temperature corner of 120 degrees may define a particular exemplary view. Multiplying, for example, 3 voltage corners, 3 temperature corners, 10 process corners, 3 dopant corners, and 5 modes arrives at 1350 views. However, as the time to test gigascale and beyond systems with 1350 different views would be untenable, the placement and routing and signoff tools generally utilize a subset of those views tempered with the need for broad verification. Nonetheless, an exemplary number of views used may be tens to hundreds of views, where each analyzed view generates operational timing data on each of the hundreds of millions of gates and every interconnection therebetween.

Calculating through a gigascale design with even just 100 different views is an incredibly processor, time, power, and storage intensive task. Each time a change is made to the design, a battery of tests must be re-run which may oftentimes take several days to perform. Aggregating such delays results in tremendous wasted time, money, and manpower to such an extent that some changes and fixes may be too prohibitively expensive to actually implement. Anytime the signoff test finds a violation, a repetitive loop of Engineering Change Orders (ECOs) directed to the physical implementation engine must be entered. This ECO loop iterates repetitively through a physical implementation of placement and routing to correct errors or violations located and detected in the signoff process. It is only when signoff completes 100% accurately reporting zero violations that the chip may then proceed to production. Even a single minor violation or flaw in a system design such as the minor, but notorious, PENTIUM(R) bug of the nineties resulted in approximately half a billion dollars ($450 million) of recall and replacement expenses and untold loss of goodwill for INTEL(R). System designs and marketplace stakes have only increased in the succeeding decades.

Unfortunately, in the physical optimization portion, fixing one violation may actually result in creating more violations. Due to substantial differences between the physical implementation placement and routing engine and the signoff static timing analysis (STA) engine, the physical implementation portion often overfixes or underfixes detected violations resulting in substantial re-analysis/fixing loops. The two engines perform very different estimations/calculations of the results of the fixes which only exacerbates such loops and leads to the widely divergent design-view leading to over/under-fixing and in turn resulting in numerous ECO loops and great delay.

Only complicating further such processes—owing to the large amounts of data and processing time required at a physical implementation engine, the design is generally broken up into a plurality of partitions and each partition is optimized and analyzed in the physical implementation engine. The physical implementation engine may determine that each individual partition is violation free. However, only once the partitions are rejoined and evaluated again in the signoff STA engine, do some types of violations manifest themselves. Yet further complicating such physical implementation P&R to STA handoff, the signoff STA-type engine generally must exercise all paths through the design including a plurality of clocks whereas the physical optimization engine may only exercise one clock. The plurality of clocks may exist due to a separate clock for a main processor, a memory, and/or an input output (TO) bus. The signoff engine cannot be allowed to miss violations and must therefore be much more accurate and intensive, exercising the entirety of the design, whereas the physical implementation engine may only test a portion of the design due to time, storage, and processing constraints. Moreover, the signoff STA may become aware of parasitics or intercoupling between elements that may not be determined at all in the physical implementation engine.

When the physical implementation engine seeks to fix a violation, it generally has a number of strategies to correct such violation, such as, for example, inserting a buffer into the design such that a signal inputted at a portion A arrives at a portion B on time without a timing violation therein. Alternatively, to introduce a greater or lesser amount of delay in the signal, a particular logic gate or buffer may be resized. Such resizing or insertion of a buffer may change the delay therethrough and may introduce additional rule, constraint, or timing violations. Moreover, the buffer may be inserted in an illegal location conflicting with other components of the design which may only be determined later in the signoff stage thus resulting in more iterative loops back to implementation to legally place the buffer or move other conflicting components which again may result in further ECO loops. It is seen that such physical implementation and signoff differences and complexities experienced in fixing one problem may result in 99 problems. Such repetitive looping amongst separate tools along the EDA flow is a substantial impediment to timely fabricating physical devices for market consumption and constraining costs to recoup on extensive research and development costs.

Several strategies may be employed to combat the excessive delay and expense typically encountered in electronic circuit design in terms of processing, storage, manpower, and the like. First, signoff static timing analysis (STA) and physical implementation optimization may be distributed amongst a plurality of processors which may reside on a plurality of host processing systems. For example, if there are 1,000 views comprising a certain number of operational modes and corners (multimode-multicorner MMMC), a first CPU may be responsible for determining a first 500 views whereas a second CPU may be responsible for signing off a second 500 views. It should be noted that this is an extremely simplified example and any number from 1 to n processors may be utilized such as in a server farm or massively parallel internal or external cloud-type processing system.

Once the distributed multimode multicorner (MMMC) timing and signal integrity analysis is performed, such as, for example, in a static timing analysis engine distributed across the plurality of CPUs, then a certain amount of timing data output will be generated by each CPU. This will generate a massive amount of setup/hold timing graph data and various other operational timing data of the circuit design under analysis. However, this massive amount of timing data may not all be needed for optimization following an engineering change order (ECO) resulting from a violation determined in timing signoff. In a first instance, where there are potentially no violations, the data gathering may be obviated. In a second instance, where only a few optimizations or violations need to be resolved, certain types of data may be superfluous to the optimization process. Where, generally, such signoff analysis may output twenty to, potentially, several hundred types of data regarding the timing data of the analysis, potentially only four or five of the twenty may be needed to optimize or resolve violations. Rather than provide an ECO timing database with all twenty types of timing data promiscuously added which will not be used, a compressed or lightweight ECO timing database (DB) may be selectively generated to include only those fields or types of timing data which may be necessary for the optimization or resolution of violations. Thereby, a substantial decrease in the timing database may be realized. Whereas previously a characteristic output may include hundreds of gigabytes of timing data for each view, the timing data may be selectively reduced by several orders of magnitude to, for example, only hundreds of megabytes per view.

Still further, this ECO timing database generally relates to the entirety of the integrated circuit (IC) design. However, it is seen that the entirety of timing data is not necessary as only the violations and neighbors dependent, impacted, or affected thereby may be needed by the physical implementation optimization engine. The region of impact is selectively defined to encompass any possible ramifications due to a time violation therein or likely corrective action subsequently taken to remediate the identified violation. Moreover, the timing databases may be selectively reduced to include only the violations and affected neighbors. Generally, only downstream components are affected, though, a buffer resize may change the load on supplying gates and the region of impact of affect may be extended to include those components as well. The number of node hops may be gauged by a depth setting which may be selectively set responsive to a type of corrective action anticipated. For example, a depth of one may be preset for corrective buffer insertions as the insertion of a buffer may not generally be seen to have a substantial downstream effect two nodes away from its insertion. Indeed, most effects are seen within one node hop of a remedial buffer insertion.

Where a gate or buffer is resized to generate a different type of delay, a depth setting may be preset to be two where two nodes displaced from the buffer or gate resize may experience significant enough effects to be extracted and tested. Such depth settings may be modified depending upon heuristics observed. In a preferred embodiment, a depth setting of one hop from timing violations or impacted gates is employed. Thereby only a tiny fraction of the timing data normally is selectively pared from the universe of all timing data of all views of the circuit design to enable expeditious signoff and optimization thereof.

To further aid the timing signoff and optimization and reduce the number of iterations of the ECO optimization/signoff loop, corrective actions such as buffer insertions or gate resizing may generally be performed in a physical-aware context where the physical layout of the system is consulted during ECO generation of the optimization engine. Thereby, layout modifications in the form of ECOs, rerouting, optimizations, and other changes may be minimized. Rather than a repetitive iterative loop between the physical placement and routing (P&R) optimization engine and signoff STA engine, one ECO loop where physical placement and minor routing changes are performed, a signoff STA is performed for a number of views, and any violations that are caught are passed back to the physical P&R optimization engine for minor resolution, and are then ultimately passed back through the signoff engine for final verification before chip fabrication preparations.

The optimization engine may be further modified to arrive at better timing estimations relative to the STA signoff engine after buffer insertion, resizing, or other such remedial efforts, by considering relative timing changes or sum of deltas based upon highly accurate STA-supplied initial timing characteristic values as opposed to absolute timing changes on P&R generated timing values. The optimization engine may utilize a delta or change in delay times calculated by the fixed delay minus initial delay to arrive at delta or change in delays which are then summed to get better estimates correlating closely with final timing signoff verification to thereby avoid over-fixing or under-fixing detected timing violations. As the optimization timing estimations will closely match the signoff STA timing analyses multiple ECO loops iterations are avoided and timing signoff close may be accomplished much more expediently.

As seen in the illustrative block diagram of FIG. 1, a simplified exemplary circuit design 100 of a system on chip (SOC) includes a plurality of interface pins 101, interchangeably referred to herein as pins, terminals, ports, and the like. Additionally, a central processing unit (CPU) 108 is coupled via a bus 106 to a memory module 104, shown as a random access memory (RAM). The CPU 108 is additionally coupled to a graphics processing unit (GPU) 110 and the circuit design 100 also includes an interface 102 meant for interfacing with external peripherals and hosts. The exemplary circuit design 100 is merely a highly simplified graphical representation of an exemplary system on chip design. The actual circuit design may comprise potentially tens to hundreds of millions of instances where each instance may be defined by a plurality of logical gates, components, or nodes (used interchangeably herein) such as AND, OR, NOR, XOR gates, and the like, arranged upon or within a semiconductor substrate to implement a plurality of logical functions such as, for example, an adder, arithmetic logic unit (ALU), floating point unit (FPU), and the like.

While FIG. 1 shows a highly simplified graphical representation of the circuit design, such circuit design may include a plurality of different data abstractions such as a logical representation (also referred to as a schematic), which maintains a qualitative component list and interconnections between these components and some small degree of connectivity information. Additionally, a physical implementation abstraction (also referred to as a layout) includes a fully fleshed-out, elaborated, placed and routed representation of the circuit design. The physical layout generally includes an actual coordinate-mapping of absolute physical locations of all of the components of the circuit design onto a semiconductor substrate and its specific dimensions thereof. Additionally, interconnective routing and the exact paths for electrical impulses and signals to follow between components throughout the circuit design are also fully detailed therein.

Figure 1A:
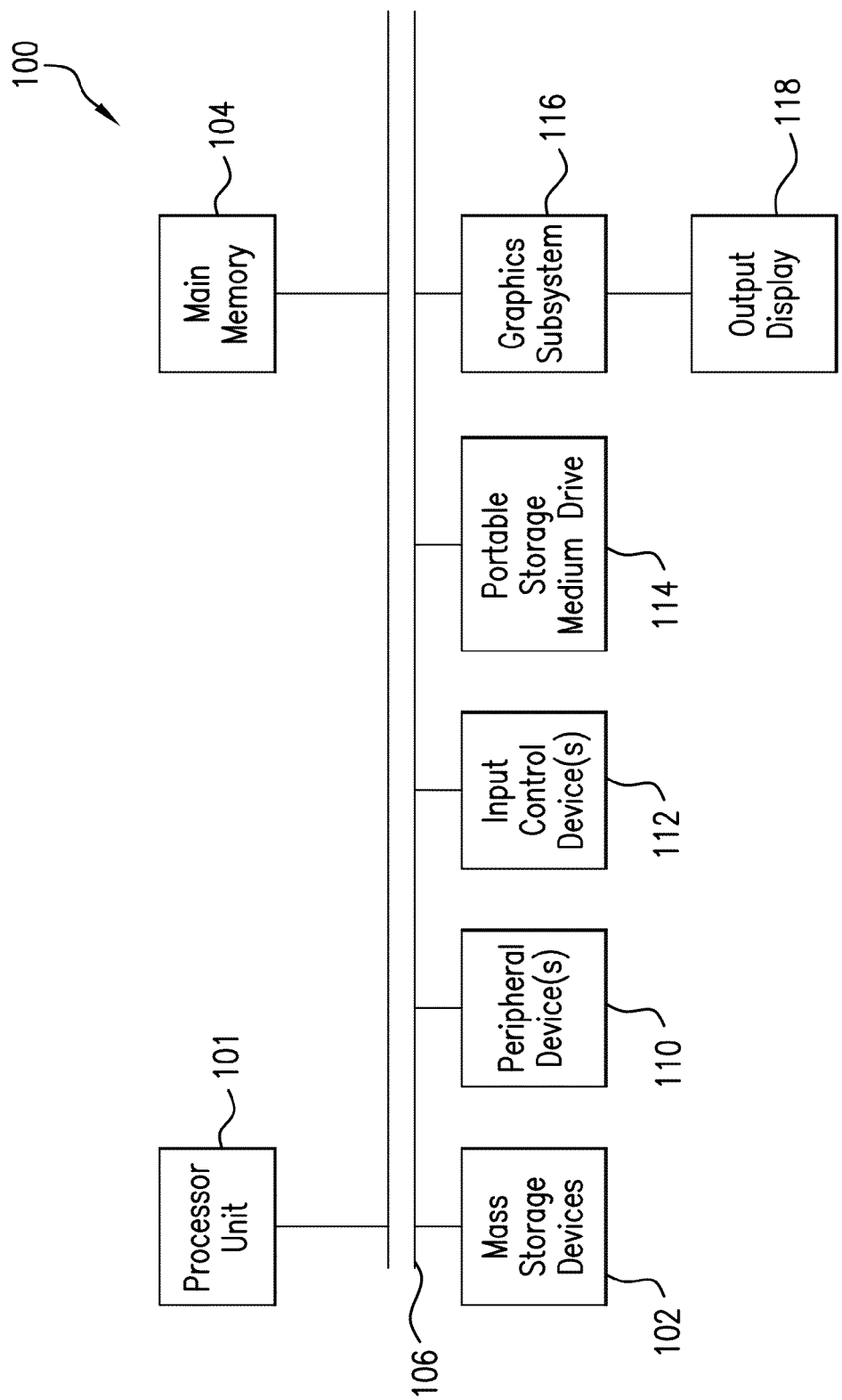
FIG. 1A is a block diagram illustrating an exemplary interconnection of components in a processor-based system for implementing an exemplary embodiment of the present invention.

Turning to FIG. 1A, an exemplary block diagram of a computer system for hosting and/or executing an exemplary configuration of the disclosed system and method respectively is illustrated. A computer system 100 contains a processor unit 101, a main or primary memory 104, an interconnect bus 106, a mass storage device 102', peripheral device(s) 110, input control device(s) 112, portable storage drive(s) 114, a graphics subsystem 110, and an output display 118, amongst other components (components may be used herein at varying levels such as a gate component or a black-box type component such as, for example, the main memory component). Processor unit 101 may include a single microprocessor or a plurality of microprocessors for configuring computer system 100 as a multi-processor system, additionally, each physical processor unit 101 may include a plurality of cores. Main memory 104 stores, in part, instructions and data to be executed by processor 101 along with circuit design data including timing data. Main memory 104 preferably includes banks of dynamic random access memory (DRAM) as well as high-speed cache memory, such as static random access memory (SRAM) at various levels of the system architecture.

For the purpose of simplicity, the components of computer system 100 are shown connected via interconnect bus 106. However, computer system 100 may be connected through one or more data transport means. Mass storage device 102', which may be implemented with a magnetic disk drive, an optical disk drive, a solid state device, an attachment to network storage, cloud storage, a RAID arraying any of the above, and the like, is preferably a non-volatile storage device for storing data, databases, and instructions, to be used by processor unit 101. In certain configurations, mass storage device 102' may store portions of the software to load it into main memory 104 or into a firmware or rom.

Portable storage medium drive 114 operates in conjunction with a portable non-volatile storage medium such as a floppy disk, a compact disk read only memory (CD-ROM), or a digital versatile/video disk read only memory (DVD-ROM), to input and output data and code to and from the computer system 100. In one configuration, software portions, circuit design data, and the like are stored on such a portable medium, and are input to computer system 100 via portable storage medium drive 114.

Peripheral device(s) 110 may include any type of computer support device such as an input/output (I/O) interface, to add additional functionality to computer system 100. For example, peripheral device(s) 110 may include additional network interface cards to interface computer system 100 to additional networks. Peripheral devices may include further specialized processors such as clustered video cards utilizing graphics processor unit (GPU) floating point processing logic to supplement or supplant CPU processing. Dynamically configurable logic such as, for example, field programmable gate arrays (FPGAs) may also be coupled to system 100 through peripheral device(s) block 310. Still further, specialized application specific integrated circuits (ASICS) may be coupled thereto to implement specialized logic to accelerate or implement certain portions of the invention such as a timing analysis module, a data reduction module, and a correction module including an physical implementation optimizer engine. Such modules may be given direct access to memory (DMA) and may have their own memory integrated therein. Additionally, a rapid circuit prototype fabrication unit may be coupled to the system via a backplane or system IO port. Such fabrication unit may include, for example, a lithographic or 3d additive printer, operable to physically fabricate a circuit design defined by physical implementation data.

Input control device(s) 112 provide a portion of the user interface for a computer system 100 user. Input control device(s) 112 may include an alphanumeric keypad for inputting alphanumeric and other key information; and a cursor control device such as a mouse, a track pad or stylus; or cursor direction keys.

In order to display textual and graphical information, computer system 100 contains graphic subsystem 110 and output display(s) 118. Output display 118 may include a cathode ray tube (CRT) display, liquid crystal display (LCD), active matrix organic light emitting diode (AMOLED), plasma display, projector, or the like. Graphic subsystem 110 receives textual and graphical information and processes the information for output to display 118.

In a software implementation, the portions of software for certain measures may include a plurality of computer executable instructions, to be implemented on a computer system such as system 100. Prior to loading in the computer system 100 or firmware, the software may reside as encoded information on a computer-readable tangible medium such as a magnetic floppy disk, a magnetic tape, CD-ROM, DVD-ROM, flash memory, network attached storage (NAS), or any other suitable computer readable medium. Such software may control multiplexors, selectors, field programmable gate arrays (FPGAs), or the like to implement logical control of timing analysis, data reduction, and/or physical implementation optimization features.

In an illustrative implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figure 2:
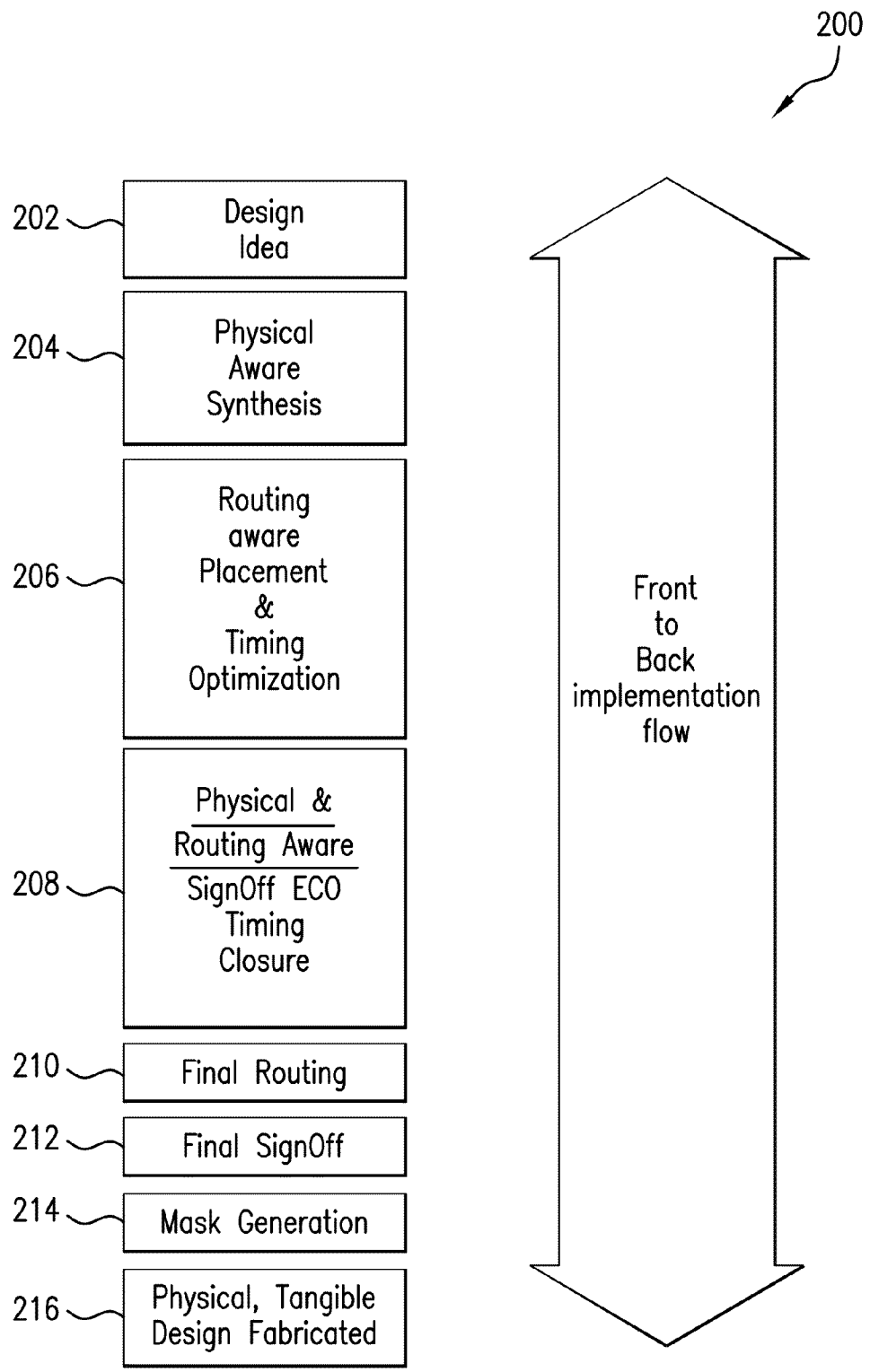
FIG. 2 is a flow diagram illustrating an exemplary flow through an electronic design automation (EDA) design flow beginning with an idea and culminating in a physical, tangible, operable fabricated device.

As seen in FIG. 2, an exemplary electronic design automation (EDA) flow 200 is shown. A circuit design starts with a design idea 202 which may be a seed of a design conceived by a team of circuit designers to address a need or necessity. Following a design team's idea for a new circuit design, a physical aware synthesis stage 204 is executed which seeks to create a logical schematic of the circuit design which more fully elaborates the designers' idea and seeks to capture the abstracted logic and qualitative properties required to implement the idea. Once a logical schematic has been completed, flow proceeds to block 206 where routing, component placement, and timing, parasitic optimization is performed to arrive at an optimum (or at least workable) arrangement amongst a silicon substrate housing the plurality of components to meet a plurality of design rules, constraints, and goals while the at the same time faithfully reproducing the logical functionality of the logical schematic created at block 204. The routing aware placement and timing optimization of block 206 may perform an exhaustive iterative process of trial and error to arrive at an optimized and correct design.

Once the design team for block 206 has completed physical implementation optimization and a physical layout of the circuit design has been generated, flow proceeds to block 208. At block 208, the timing signoff stage is performed whereby exhaustive timing tests are performed on the circuit design to insure that everything is correct and will work as desired. This stage is somewhat like a checksum stage where an input is provided to the circuit design and an output is expected at a certain time. However, this timing analysis is run exhaustively and in atomic detail on each and every gate, component, and/or path throughout the entirety of the circuit design. Moreover, the timing analysis in the timing signoff is performed not only once for the design, but a plurality of times, once for each representative view of the Circuit Design where a view is a unique permutation of corners and modes (as described more fully above regarding operational modes and operational corners). Therefore, the timing signoff is generally a very time, processing, and memory intensive process.

Where, generally, the timing signoff identifies timing violations and passes these violations through an engineering change order (ECO back to the placement and timing optimization block 206), instead, herein, the timing signoff selectively performs its own physical implementation optimization to address timing violations detected in the circuit design during timing signoff. With a physically aware view of the physical layout data of a circuit design, the timing signoff module may communicate with a correction module to find violations, determine regions of corrective affect, identify ideal corrective locations, and correct violations without inducing new violations. Once the timing optimization has been completed at 208, the flow proceeds to block 210 for a final routing back at the physical implementation module. As the timing signoff and correction module are physically aware and have remedied timing violations in a manner selected not to conflict with the placed components of the circuit design, the final routing stage may be relatively minor, indeed making only minor routing changes relative to the corrections.

Following the final routing stage at block 210, flow proceeds to a final signoff check at block 212 where a last exhaustive timing check is performed following the routing to ensure that all timing violations have been remedied. At block 214, a mask generation stage is undertaken which is omitted herein in interests of brevity as it is beyond the scope of the present invention though certain aspects and measures of the present invention may be utilized in such stage.

Finally, at block 216, the circuit design is actually fabricated into a physical, tangible, operable device embodying the circuit design. Such physical implementation may be incorporated into a system or composite device which will receive real-world inputs, perform multiple calculations to arrive at a decision, and produce a real-world output. For example, a video camera may monitor tires passing by on a conveyor belt, a central processor of an SOC, responsive to observations of the tires via the camera, may perform calculations to identify defective tires, and upon detection of a defective tire, a physical manipulator may be actuated by the processor to perform a corrective action on the tire.

Figure 3:
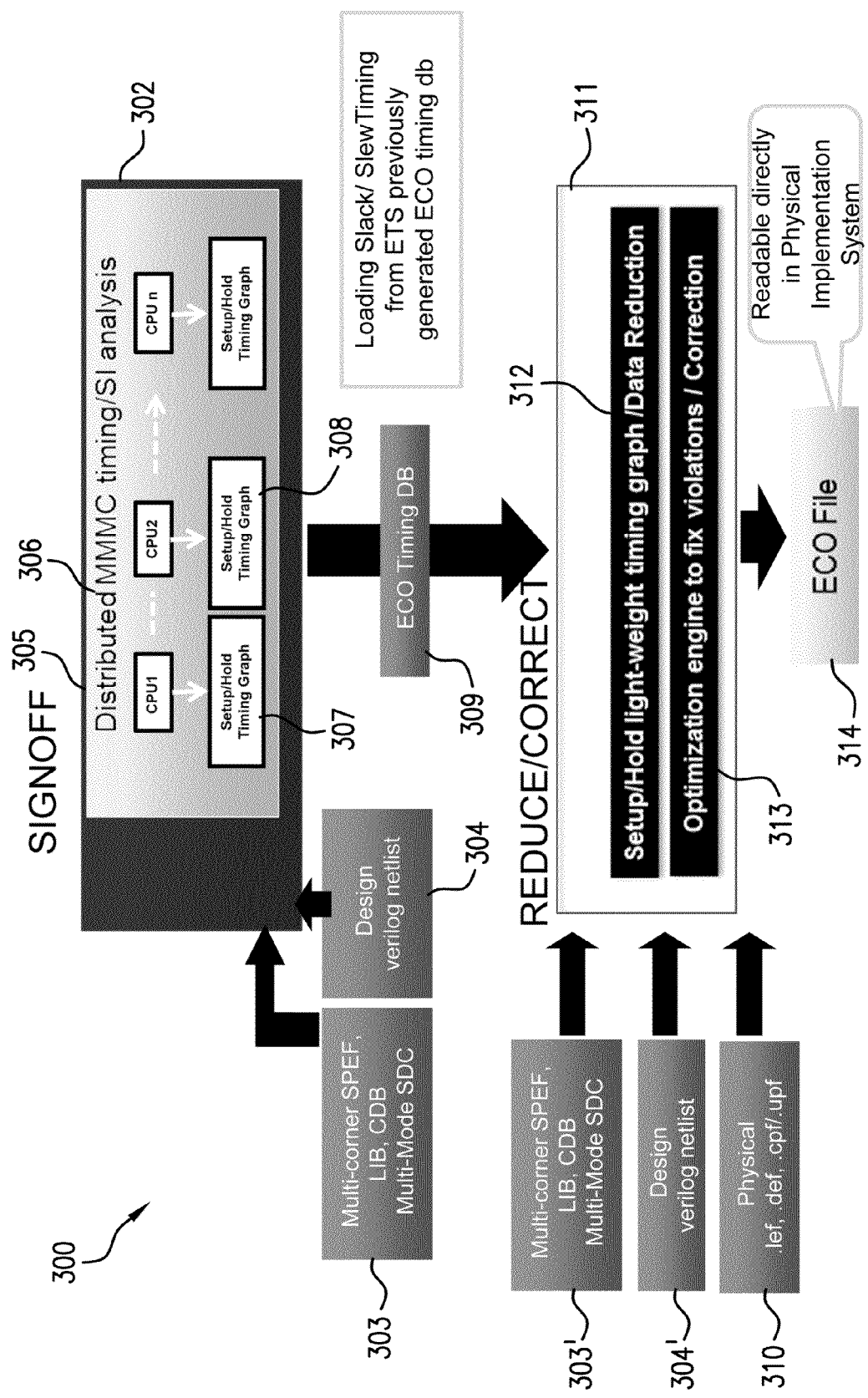
FIG. 3 is a block diagram illustrating an exemplary interconnection of functional modules in a system for implementing an exemplary embodiment of the present invention including a plurality of circuit structural and operational characteristic input data and output design transformative modification data.

As seen in FIG. 3, the reduction/correction module 311 and the setup/hold lightweight timing graph/data reduction module 312 (alternatively referred to herein as the data reduction module 312) selectively prunes, trims, or reduces the size of the universe of ECO timing database/s DB 309 coming from the distributed timing analysis of the signoff or timing analysis module 302. The data reduction is preferably a two stage or bifurcated effort, where the first stage selectively reduces operational timing data based upon the types of data that are used for the optimization. Additionally, a second stage reduces the universe of timing data responsive to a timing violation and an affected region (or subnetwork) of the timing data of the timing violation or of possible corrections for the timing violation.

The timing analysis signoff module 302, data reduction module 312, correction module 311, and optimization engine 313 are shown in a timing analysis, data reduction, and correction/optimization flow 300. A plurality of physical implementation data sources 303 are input to a signoff timing analysis module 302. The various physical implementation data sources 303 includes a multimode multi-corner (MMMC) extraction such as in, for example, an SPEF-type file, though any suitable file type for representing operational corners may be utilized. Additionally, a plurality of design constraints are imported which may be embodied in, for example, a multi-mode SDC-type file, or the like, though any suitable file type may be used. Additionally, a design verilog netlist 304 including logical design data, a physical geometry of gates, and a routing physical implementation data may be provided as well. The signoff timing analysis module 302 employs a distributed multi-mode multi-corner timing and signal integrity (SI) analysis by distributing the load of the analysis amongst a plurality of processors, machines, cores, and/or cloud-based processing. Shown is an exemplary first CPU 305 and an exemplary second CPU 306; however, there may be any number of CPUs, independent systems, and virtualized systems, perhaps implemented in the cloud.

Each of the CPUs 305 and 306 perform a distributed multi-mode multi-corner timing or signal integrity analysis, for example, with the extensive amount of physical implementation data being divided up by views where a view is a unique combination of operational mode and corner, amongst the CPUs. For example, the first CPU 305 may receive a first view of the physical implementation data and perform a signal integrity and static timing analysis or other such analyses on the physical implementation data 303 and 304 at the prescribed corner and operational mode thereof.

The first CPU 305 generates an extensive amount of timing data from the analyses including a setup/hold timing graph 307 under the specified mode and corner conditions. Likewise, the second CPU 306 performs an analysis on the specified mode and corner combination to arrive at a second setup/hold timing graph 308. Additionally, an engineering change order (ECO) timing database (DB) 309 is generated by an ECO DB generation module (not shown) while retaining all timing data for the design in an archive for future use. The complete timing data may be employed for many different types of violations, such as, for example, hold fixing/setup fixing/leakage reclaim, and the like. There may be one monolithic ECO timing database 309, or there may be n ECO timing databases, one for each CPU or machine employed for each view.

The ECO timing database 309 is selectively reduced in size from the timing data output from each CPU 305, 306. Each CPU 305 generates a certain universe of timing data having an assortment of data types derived from the timing analysis of the physical implementation data. However, only a select few types of that data based upon anticipated optimization engine need will be utilized therein. Whereas the signoff timing analysis module 302 may generate, for example, a slack timing characteristic data, a slew, an arrival time, a required time, a timing phase, and the like, only the slack and slew data are required for optimization of the physical implementation data 303', 304', 310 for each view. The STA generates multiple timing phases, in general one per clock that is feeding the path. The ECO timing database 309 is therefore selectively pruned or trimmed to substantially reduce the size thereof for each view.

For each terminal of each component within the circuit design, a setup/hold, rise/fall slack, rise/fall slew, rise/fall arrival time, rise/fall required time, timing phases, arrival/required level, and hundreds or more types of data are generated for each view of the physical implementation data 303', 304', and 310. For each timing edge or connecting terminals, a setup/hold rise/fall slack, isDisabled, is Flush, and hundreds of other types of data for the timing edges are generated. This results in an extensive amount of data for each view and where there are potentially a thousand data view combinations of modes and corners, the data becomes incredibly large. Rather than utilizing the entirety of the timing analysis data, an ECO timing database file 309 is created for each view processed from the distributed processing resources such as a CPU1 305 and CPU2 306.

Each ECO database timing DB file 309 preferably includes a version number and the static timing analysis (STA) settings utilized in the timing analysis. The ECO timing DB 309 for each view is then sorted according to the terminals of the design in a predefined manner, such as by the full name of the terminal or canonical name so that each terminal thereby has a unique identifier thereof (UID). For each sorted terminal of the circuit design, the universe of data generated for that view is selectively paired down to include only a setup/hold rise/fall slack and a rise/fall slew from the universe of data generated by the timing analysis module 302. Additionally, for each of the connected timing edges of the terminal, the setup/hold rise/fall slack, the is Disabled, and is Flush are collected.

The data is generated into a binary record including delimiters such as a comma or semicolon or the like separating data items therein though any suitable type of delimiter or file arrangement may be employed.

The binary data generated is output into an ECO timing database 309 which is performed once for each view. However, with a thousand views, this first stage of data reduction based upon the type of data needed for an optimization or correction responsive to detected timing violations standing on its own is generally not preferable. The amount of data retained even by selectively trimming based on type alone would still exceed available processing resources, storage resources, memory resources, and still violate a practical turn around time (TAT) allotted for a design team.

The ECO timing databases 309 are each provided to a correction module 311. The correction module 311 also accepts the physical implementation data including, for example, multi-corner SPEF, LIB, CDB multi-mode SDC 303' and 304', though any suitable format may be utilized to provide the correction module with the defined timing views which are enabled for optimization. Additionally, the physical data for the circuit data is defined, in for example, a .LEF or a .DEF file, though any suitable file may be used. The logical design, preferably defined in a verilog netlist, is loaded into the correction module 311 as well. A setup/hold lightweight timing graph is generated through data reduction occurring in the data reduction module 312.

The data reduction module 312 performs responsive to detection of a timing violation in any of the ECO timing databases 309. The data reduction module 312 selectively identifies the location of the timing violation as it corresponds to the logical verilog netlist as input at 304' and/or the physical implementation data as input at block 310. Such correlation may be performed with instance names, unique net, pin, terminal, or component identifiers or canonical locations. With the physical, logical, and timing data loaded, for each timing violation, a region may be determined of dependent, consequential, or affected violating portions or components, which may be gates, and other components in the circuit design that are affected either by the timing violation itself, or likely corrective action thereupon, such as the introduction of a buffer, or a resizing of a gate along the path encountering the initial timing violation determined within the timing analysis.

All of the ECO timing databases 309 are opened in read mode from the hard disk for extraction of the reduced data sets therefrom. First, the consistency of the header information for all of the ECO timing databases 309 are checked to ensure the same static timing analysis was performed and the version numbers aligned. The terminals of the design are sorted in a predefined way such as by the full name of the terminal, such that each terminal thereby has a unique identifier. This stage may be performed in the same manner as performed earlier with the writing of each individual ECO timing database.

As a hold violation fixing example, all of the hold violating terminals and their regions of impact are collected and loaded into memory or a temporary storage location. It is to be noted any type of timing violation may be addressed herein; some illustrative examples include: hold/setup/leakage-reclaim/design-rule-violation and the like. A blank list T of affected terminals is instantiated or created. For each sorted terminal t, the record for the terminal t from all of the ECO timing databases 309 is evaluated. If the terminal t is present in the list T of affected terminals, then the ECO timing database 309 record is loaded into either memory or a temporary storage area to generate a lightweight setup/hold timer. If however the worst hold violation or slack across all of the ECO timing databases 309 from each of the views for this terminal t is not violating, then the database record for this terminal is responsively discarded (or not selectively extracted into the lightweight timing DB). If none of the timing in any of the ECO timing databases 309 are determined to contain a violation, then this terminal will not be utilized for the correction/optimization later and may be discarded. Otherwise, if at least one of the slack or hold timings indicates a timing violation for a given terminal t in any of the view-based ECO timing database 309 generated for any of the views, then the ECO timing database record for the violating terminal is loaded into the lightweight setup/hold timer.

Additionally, the other terminals in the region are identified to determine which are affected if the violating terminal is optimized, perhaps by inserting an additional buffer or resizing a gate along a path thereof. Any of the identified terminals in the affected zone or region are included into the list T of affected terminals. Flow then proceeds to a next sorted terminal in the ECO timing database 309 where it is determined whether the next terminal t is present in the list T of affected terminals, such as those identified to be within a region of impact, or resultant violation, therein. If the presently interrogated terminal t is indeed determined to be affected, such as if it were in the list T of affected terminals and the node or term has a timing violation, then the ECO timing database 309 record is then loaded into the lightweight setup/hold timer, the flow proceeds and the affected zone or region is further determined for this terminal t. This loop of investigating each individual terminal in the circuit design for each individual view is performed iteratively until each of the terminals t have been determined. The collection and loading of all hold violating terminals and impacted regions has thereby been completed resulting in the generation of a lightweight timing DB to be utilized in the optimization engine 313 of correction module 311.

A forest connection is identified and established in the lightweight setup timer to connect not-connected hold violating regions or paths. Each of the ECO timing databases 309 are opened and evaluation of the header information may be skipped. For each endpoint of the timing path in the circuit design, it is checked whether the endpoint has an ECO database record. If there is no record in the ECO timing database 309, then the forest flow continues. Each end point may be a component or a terminal. If the end point is not hold violating, as determined from its ECO timing DB 309 record, then flow continues. The fan-in cone of the end point is then traversed in a breadth first search (BFS) manner until the beginning point is reached. All of the terminals in the fan-in cone are marked or denoted such as with a color "red," data flag, or metadata thereupon—any suitable identifier may be used. For each beginning point of the timing path in the circuit design, it is checked to determine whether the begin point has an ECO timing DB 309 record—if not, flow continues. If the begin point is determined to not be hold violating, as determined from the ECO timing DB 309 record, then continue. The fan-out cone of the beginning point is traversed in a BFS manner until the end point is reached. All of the terminals in the fan-in cone are marked with a color such as "green", data flag, or metadata thereof.

For each sorted terminal in the design, read the record therefor from all of the ECO timing DBs 309. If the presently interrogated terminal is marked both "red" and "green" or has data flags or metadata indicating that it met both of the previous paragraphs' determination of begin and endpoint, then the terminal is connecting two or more not-connected hold violating regions. The ECO timing DB 309 record is loaded in the lightweight setup timer and the forest flow continued. Otherwise, if the interrogated terminal is not marked both "red" and "green" or signified to be part of the beginning and endpoints, then the ECO timing 309 record is discarded from memory and the flow continues.

In contradistinction to previous optimization engines where an exemplary thousand views of a circuit design having potentially hundreds of millions of gates each with potentially hundreds of different types of timing data were all summed, the instant measures select only types of timing data needed for a correction or optimization and only regions affected by a timing violation or corrective action therefor, rather than the entirety of the hundred million gates design. The design's timing data is thereby selectively paired down by regions of affected gates to include for example, 5,000 gates as opposed to 100,000,000 gates. Whereas each of the circuit designs timing data may included hundreds of types of data, this data has been selectively pared down to approximately four to five types of data for example. The optimization engine 313 of the correction module 311 has a significantly and selectively reduced universe of timing data correlated not with the large number of views, such as 1,000 views, but instead, correlated with the number of timing violations determined within each of the views.

Turning to FIGS. 9-18, there are schematically illustrated certain examples of how regions, or zones, of potential impact surrounding a detected timing violation may be selectively defined. Since these defined regions delineate any and all parts of the circuit design data which may possibly be affected by subsequent corrective actions for a given timing violation, the processing need not be encumbered by other unaffected circuit data outside such regions. This unburdens the processing to such extent that timing violations detected in great numbers of views may be fixed without prohibitive turnaround times.

Figure 9:
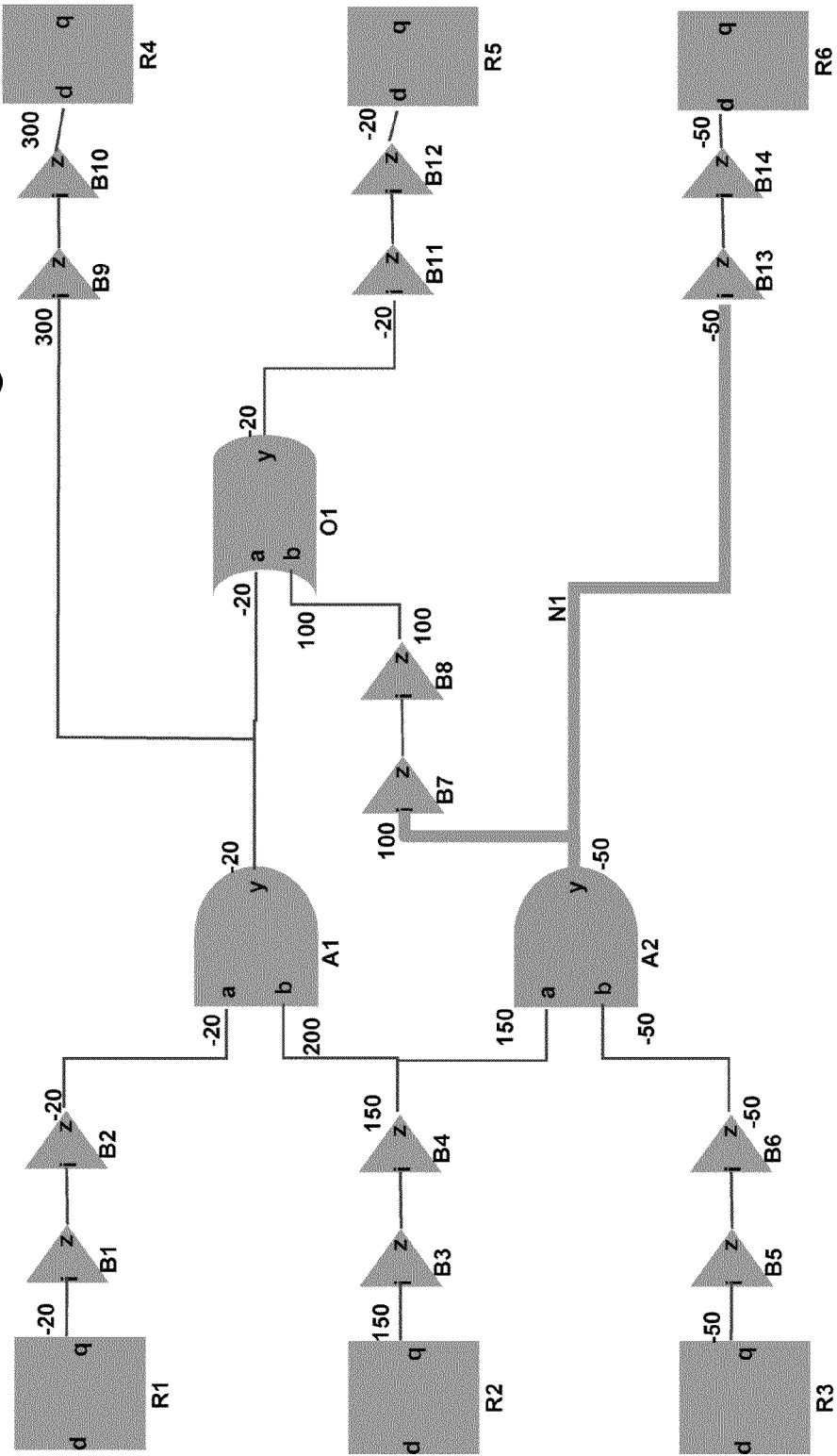
FIGS. 9-18 are simplified logical circuit schematics with a portion of time delay data in accordance with certain aspects of the present invention.

Referring to FIG. 9, an illustrative example is shown of a simplified circuit design portion including a portion of timing data, the circuit design portion having a plurality of components such as, for example, resistors R1-R6, AND gates A1-A2, buffer gates B1-B14, and OR gate O1. Each gate or component has a plurality of pins, terminals, ports (used interchangeably herein). For example, AND gate 1 A1 has three ports: two input ports a and b and an output port y. Alongside each port is a corresponding timing value shown in exemplary and illustrative format, as gathered by the timing analysis module 302 and as stored into the ECO timing databases 309. In this example, negative timing values are taken for illustrative purposes to indicate a violating condition. Taking AND gate A1 as an example, the pin a has a negative 20 picosecond (ps) timing violation, pin y has a negative 20 ps timing violation, and pin b has 200 picoseconds of timing slack which does not result in a hold violation as both pin a and pin y have. Positive values such as "300" as seen at pin i of B9 are not violations, but they are a magnitude of slack away from a violation. With a magnitude of 300, this may be the result of an overfixing or an attempted correction in a previous stage.

A net N1 has been selected herein as a plurality of timing violations such as gate A2 pin y is shown to have a negative 50 picosecond hold violation and gate B13 pin i is seen to have a negative 50 hold violation. A net N1 is a connection from one pin such as pin y of gate A2 to everything that it connects to, and in this case, it is shown as connecting to pin i of B7 and pin i of B13. To fix the net N1, an illustrative buffer insertion step is shown; alternatively, a gate resize, such as a resizing of gate A2, where a bigger gate results in a bigger delay which may affect a connected path or net delay to resolve a violation.

Figure 10:
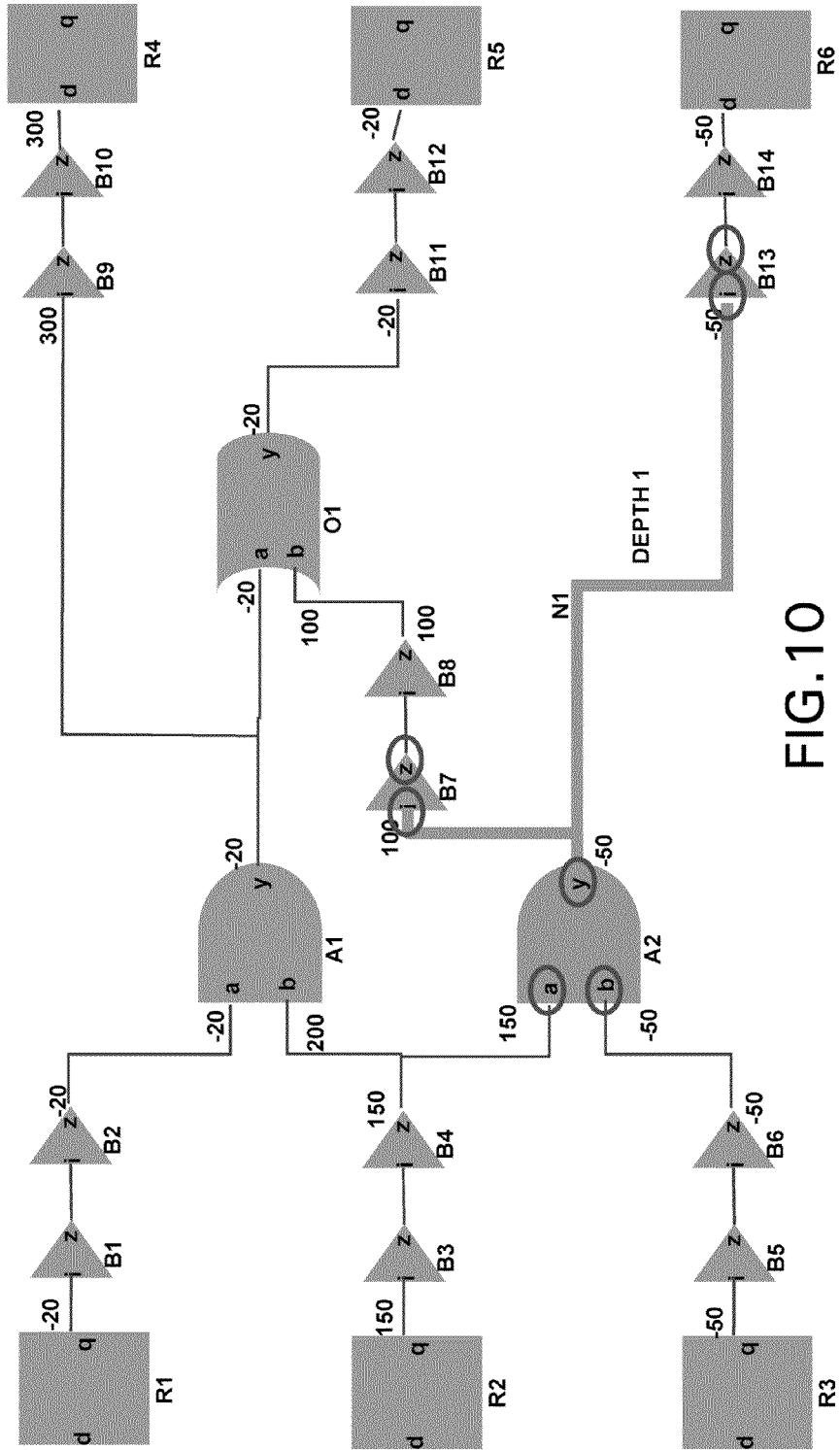

As seen in FIG. 10, a selectable parameter of depth is shown where depth is selected to be one. Through heuristics, it is determined that a depth of one will suffice to capture all significant effects of a correction action upon a timing violation delay within a particular pin or net. However, any suitable depth may be utilized. With an increasing depth, a diminishing return may be seen, and a larger timing data resulting from a diminished pruning due to the selected parameter, however accuracy is increased to a degree.

According to the selected depth parameter, the data reduction module 312 selectively chooses pins, or terminals, terms (used interchangeably herein as an instance or component pin) within an affected region of a timing violation for inclusion in an affected region to be included in a lightweight timing data. In the instant example, pin y of gate A2 is selected as the root timing violation having a negative 50 picosecond hold violation. As any change thereupon or buffering thereto would affect a load or delay across gate A2, pins a and b are selected within the affected region which will be loaded into the optimizer for corrective action. It is seen that the pins i and z of gate B7 and pins i and z of gate B13 are additionally selected as well due to their connection to the root timing violation at pin y. This is seen because any change along net N1 will have an effect on pin i and the delay or timing change would propagate across a gate B7 or B13 and thus the pin z of each respective gate B7 and B13 is selected as well. It is seen that an affected region is generally downstream from a timing violation and not upstream or backwards from whence the signal originated. Thereby, gates B6, B4, and A1 are not selected and will be omitted from the compressed, lightweight, or pruned timing data to be supplied to the optimizer engine 313.

Figure 11:
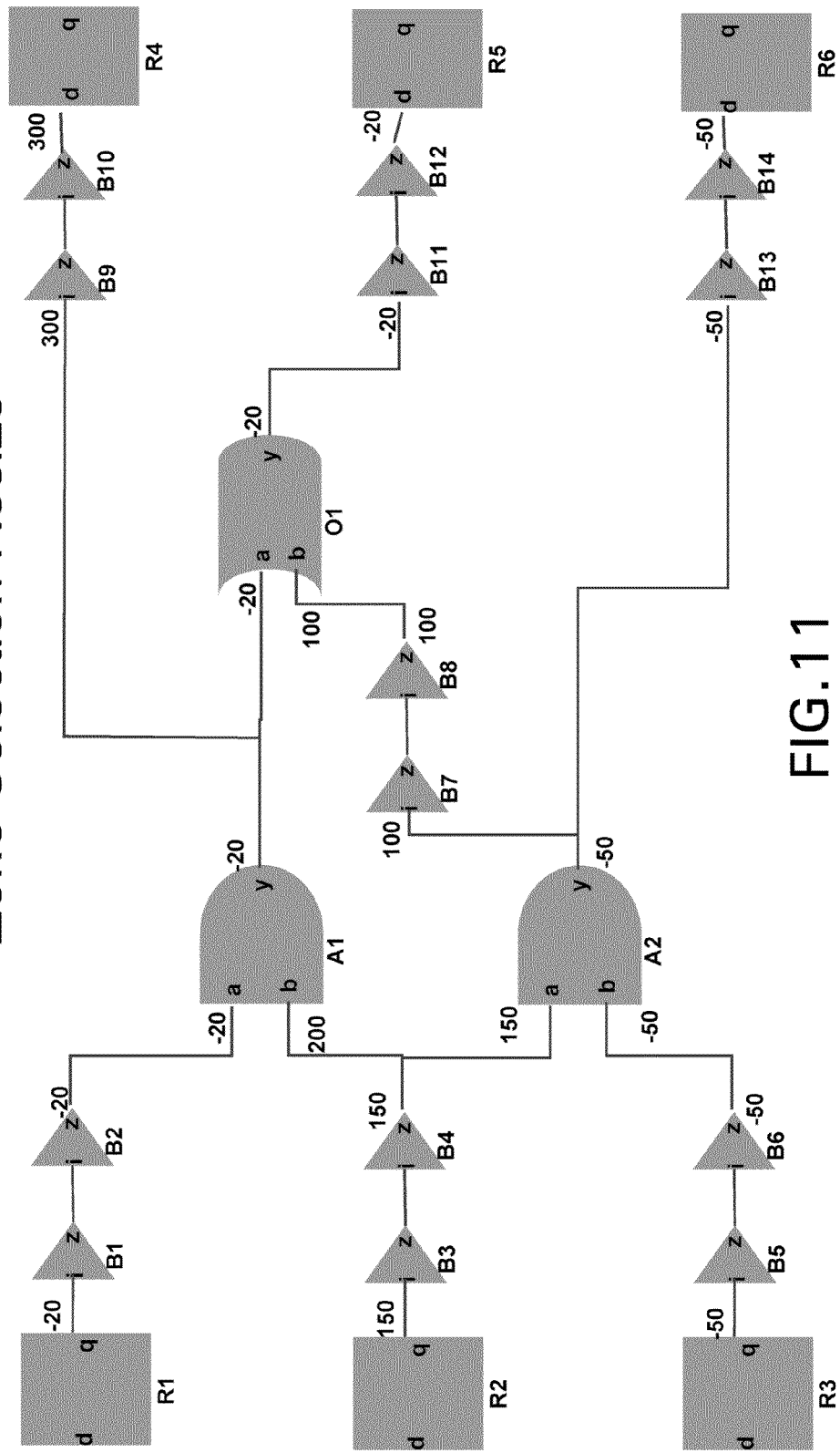
Figure 12:
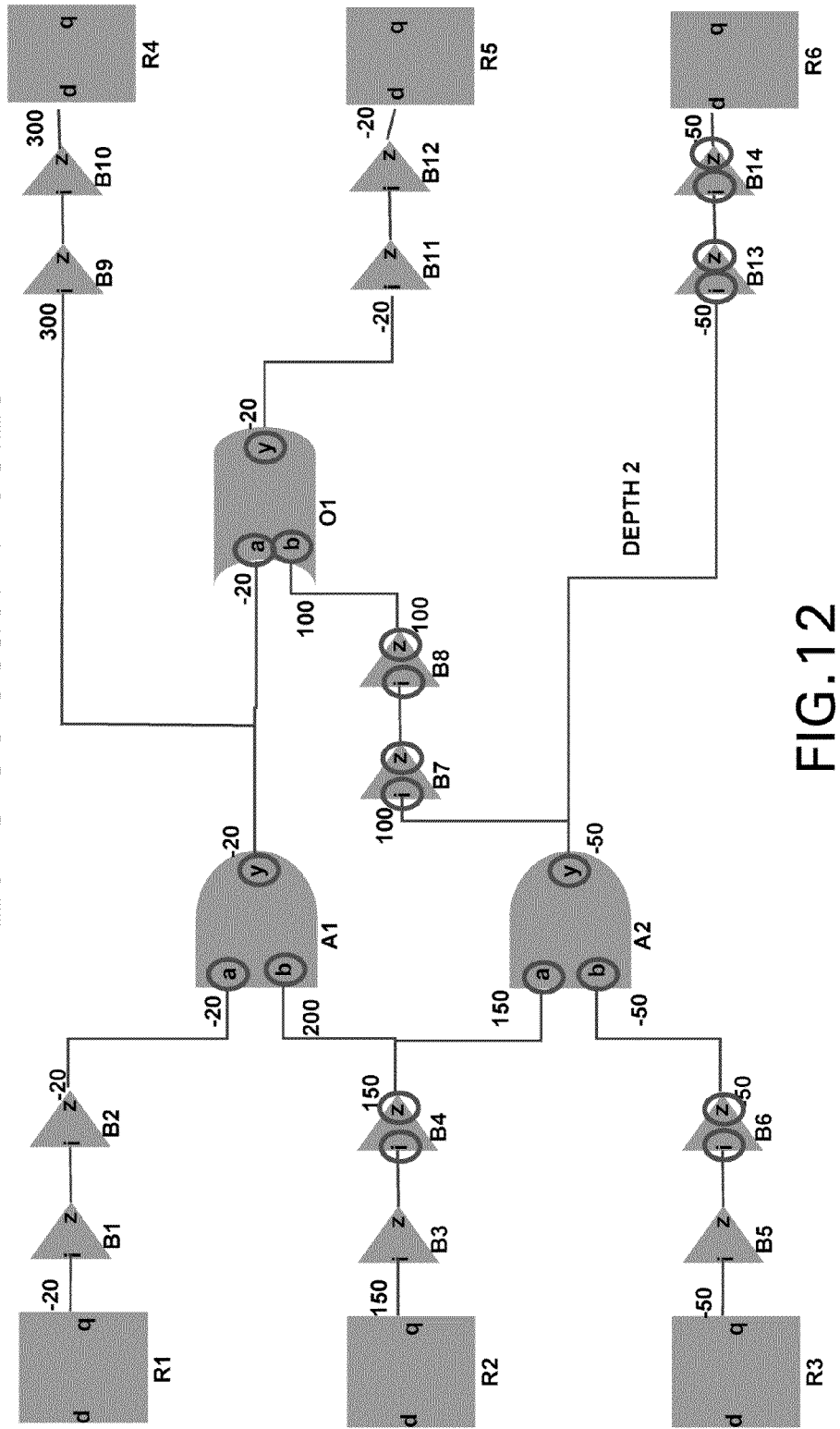

As seen in FIG. 11, a timing delay at pin y of gate A2 of negative 50 picosecond hold violation will be attempted or corrected through the resizing of the gate A2. By resizing gate A2 to be a bigger gate, the delay will be increased to thereby remediate the negative 50 picosecond timing violation experienced on the output pin y from the AND gate A2 thereof.

While it is seen that a depth of 1 is a preferred parameter, a depth of 2 is illustrated herein merely illustratively. As the gate A2 will be resized, it is seen that all three pins a, b, and y will be affected by the resizing of the gate A2 and thus they are selected for inclusion to be passed to the optimization or correction module 313 in the reduced timing data. Additionally, as the resizing of the gate A2 will change a load exerted on gates B4 and B6, their two pins i and z are included as well to model a changed load thereon and delay potentially induced thereupon. This inclusion is due to a change in potential slew rates that may be experienced by gates B4 and B6 due to the change in load of the resized gate A2. However, any change in load is contained at gates B4 and B6 and therefore, it is seen that no significant change will be seen at gates B3 or B5 and therefore their timing data is omitted from the reduced timing data.

As an exemplary depth of 2 has been set, gate A1 will be included as well. As a changed slew rate from gate B4 may affect gate A1 at an input pin b where delay from pin b to pin y may change and thus, gate A1 is selected as well. However, gate B2 is not loaded because the delay is already captured at gate A1 pin a of a negative 20 picoseconds. Thereby, gate R1, B1, and B2 may be omitted from the reduced timing data. Generally, flow proceeds forward but does not go back, only in level where a load change is occurring, potentially due to a resizing of a gate. Gate O1 is selected as well due to a depth parameter of 2 from gate B4. Gates B7 and B8 are selected as any timing delay change on gate A2 will have an effect upon gate B7 terminals i and z. It is not expected that the significant change will be needed to be measured at gate B8 but for an example, depth 2 has been selected, and B8 is thereby included, however, in a preferred embodiment, with a depth 1 a gate B8 and O1 would not be included. To reiterate, gate B4 and B6 are included due to the resize of gate A1 having a changed parasitics or capacitance of pins A and B which changes or affects gates B4 z and B6 z. The gate B13 node includes pins i and z due to its coupling to pin y of gate A2 and gate B14's pins i and z are included as well due to the depth of 2 being selectively set.

Figure 13:
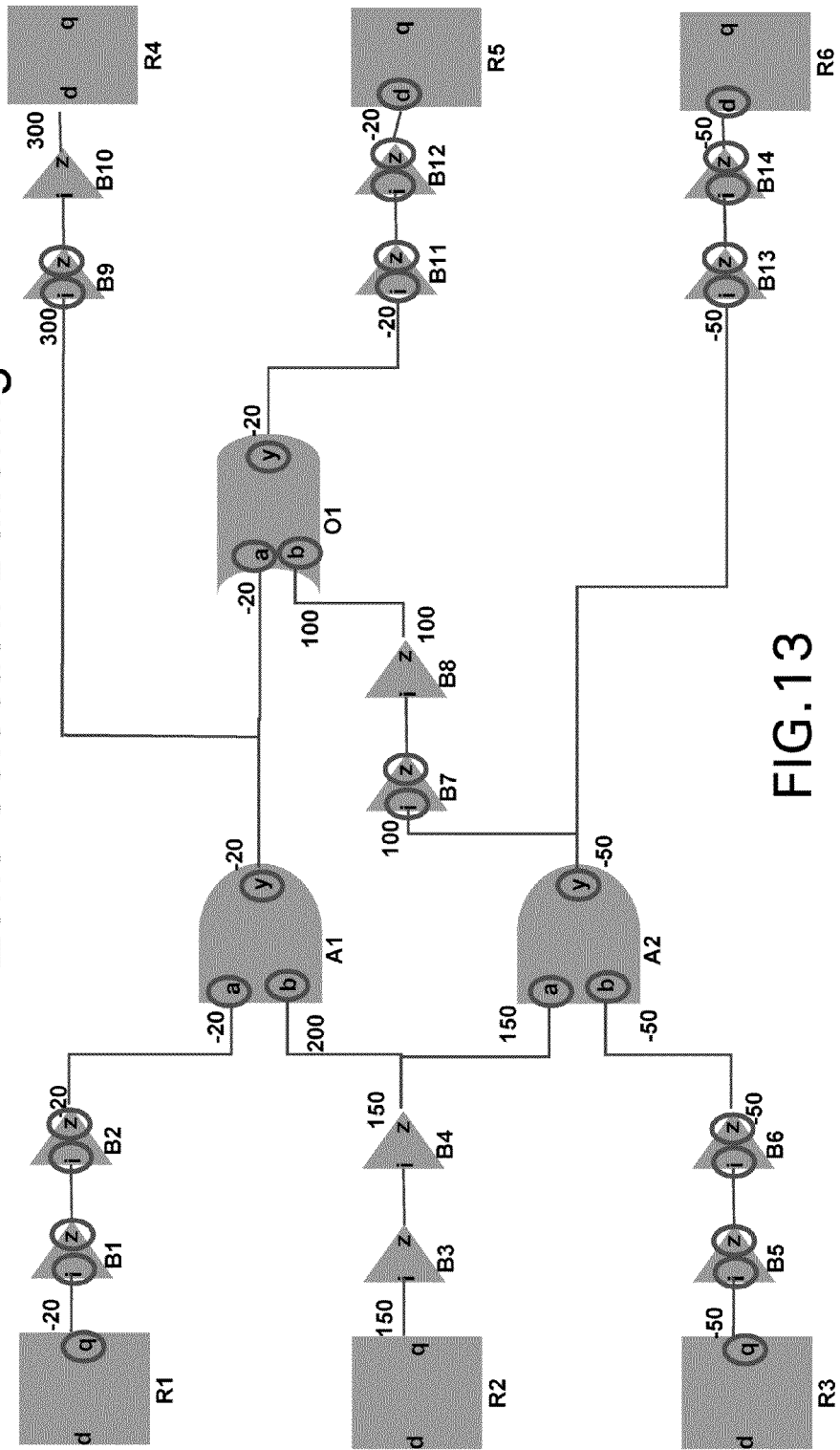

As seen in FIG. 13, an exemplary or illustrative selection of each violating node with a depth of 1 responsive to a buffering type correction is shown. Each timing violation having a negative value or a hold violation and any regions of impact to a depth of 1 are selected for inclusion in the reduced timing data to be utilized by the optimization engine 313. Thus, it is seen that all negative timing violations have been selected and, for example, gate B7 terminal i, while having a positive slack of 100 picoseconds, is selected due to a depth of 1 parameter and an effect of the timing violation of pin y of gate A2. Similarly, while gate B9 experiences a slack of 300 picoseconds, and thus is not in a hold violation, the timing data for pins i and z are included due to the downstream effect stemming from gate A1 pin y having a negative 20 picosecond hold violation. Gate B8 is not included due to it being greater than a depth of 1 downstream from a hold violation such as at pin y of gate A2.

Figure 14:
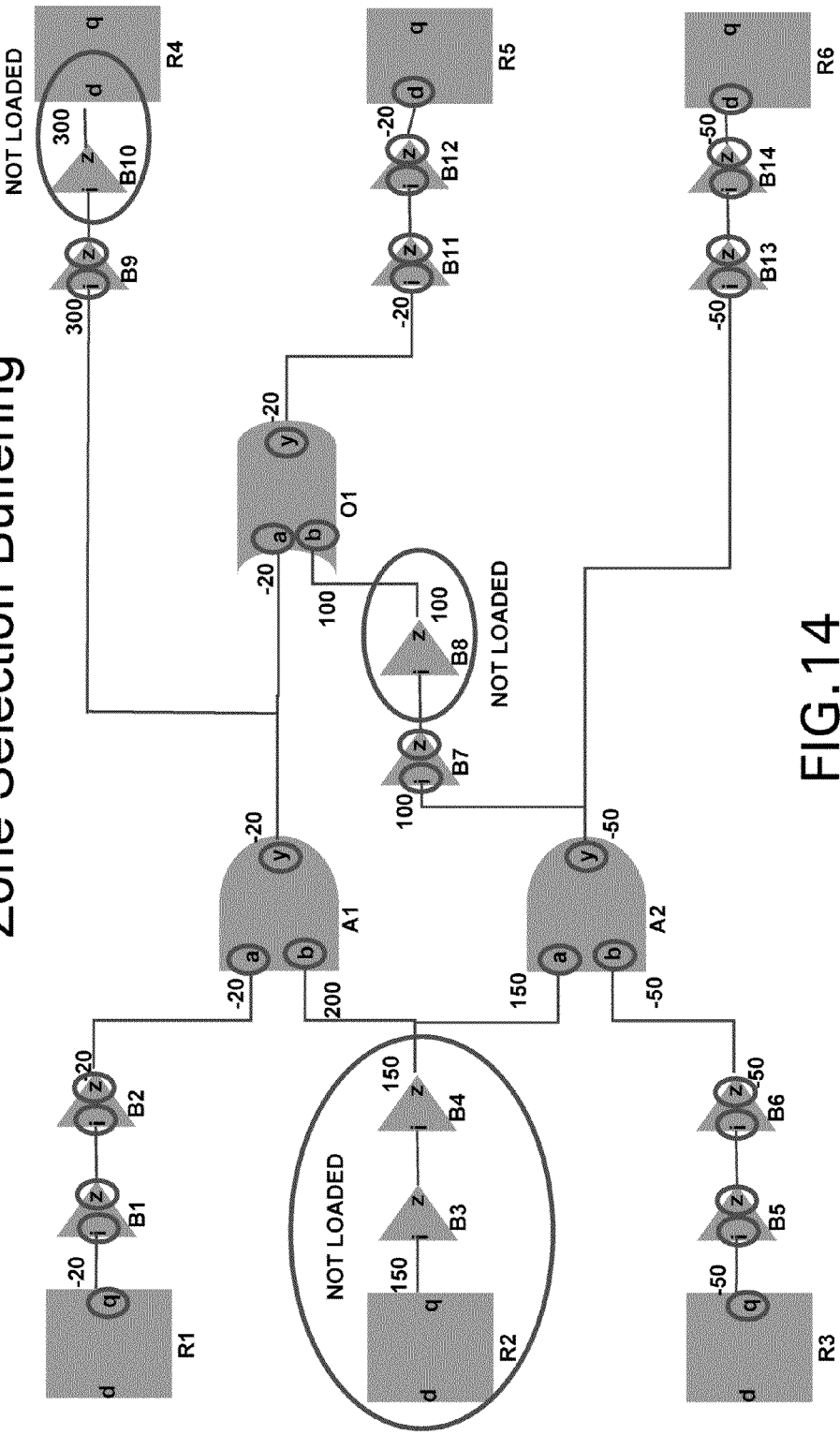

As seen in FIG. 14, a plurality of sections of the timing data are not required for loading and are thus omitted, pruned, trimmed, or selectively discarded. It is seen that the path including components R2, B3, and B4 are omitted as not-selected or needed regions and will not be utilized in the optimization or correction engine 313. Additionally, gates B8, B10 and R4 are not loaded.

Typically in a circuit design having hundreds of millions of gates, generally, a thousand or so, for example, hold violations may exist. Selecting the hold violating components and other components affected thereby may result in a necessary inclusion of approximately 5,000 gates, for example, as opposed to the hundreds of millions of gates for each view of the entirety of the circuit design. Thus, a substantial savings in the amount of temporary space needed in memory and storage space is achieved. As a result, a great reduction in processing requirements and turn-around time (TAT) is achieved as well. Thereby, design teams may initiate a signoff timing and correction overnight starting at, for example, 5:00 P.M. and return to work at 8:00 A.M. the next morning to find a fully completed circuit design.

Figure 15:
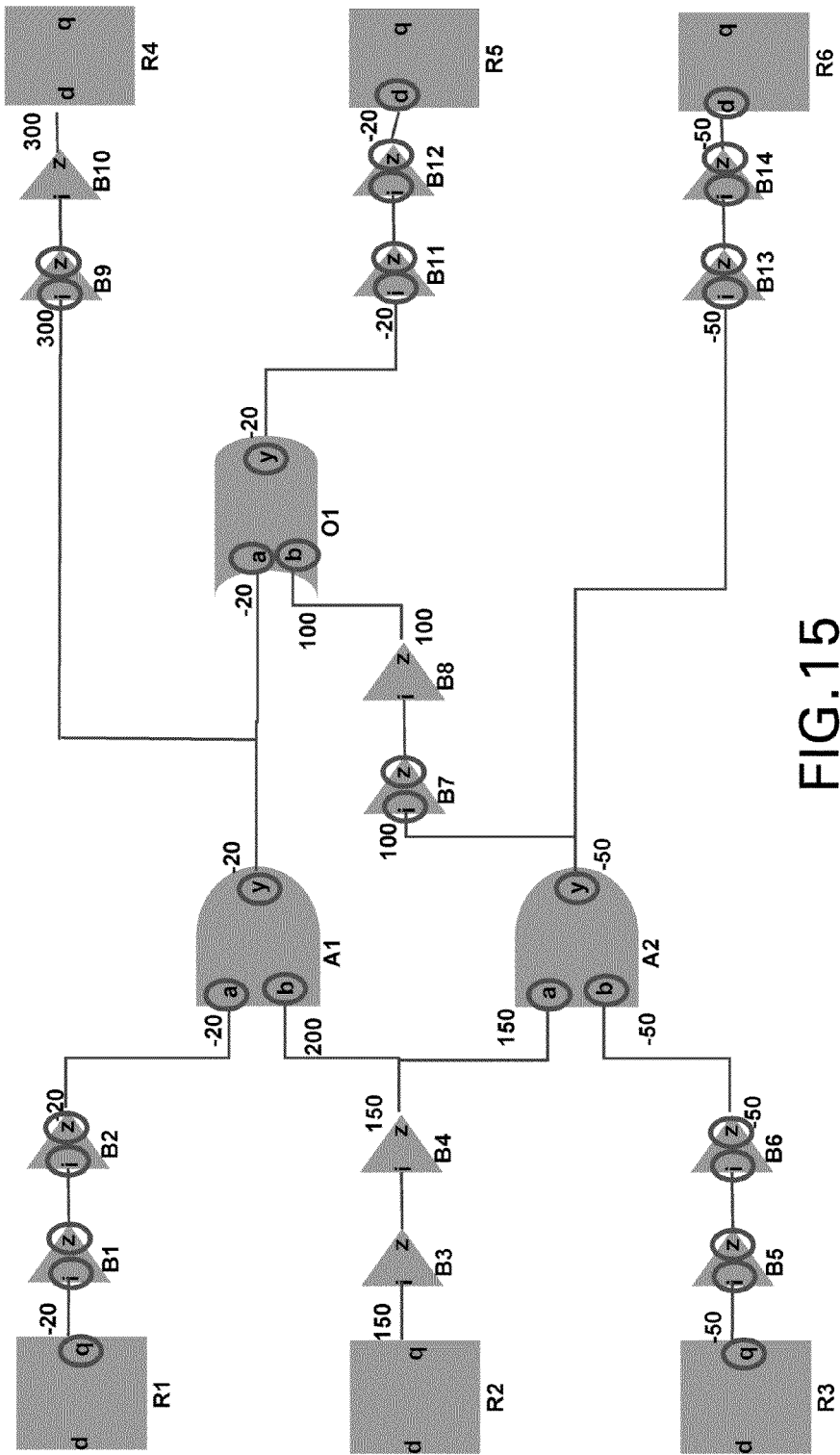
Figure 16:
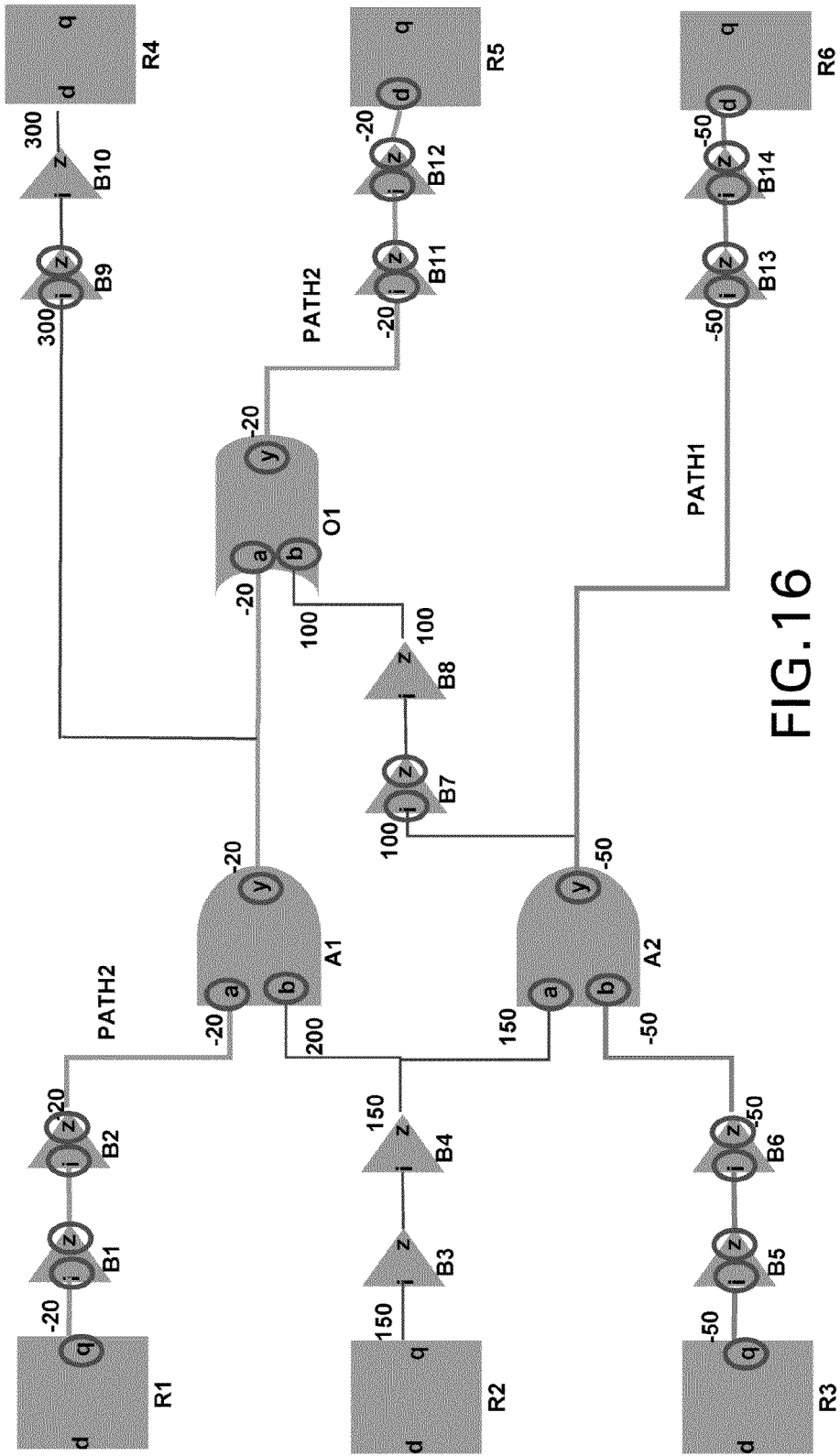
Figure 17:
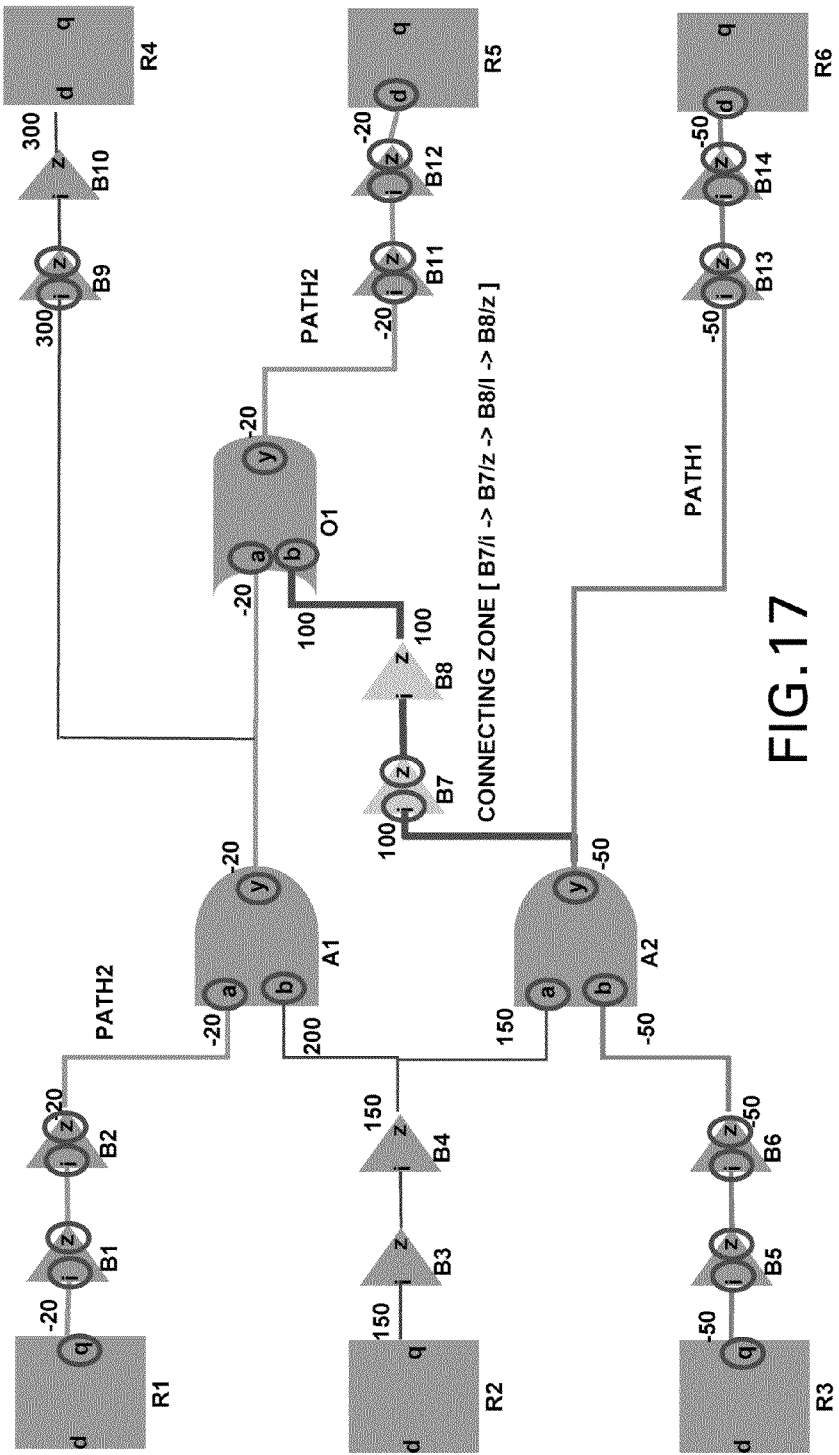
Figure 18:
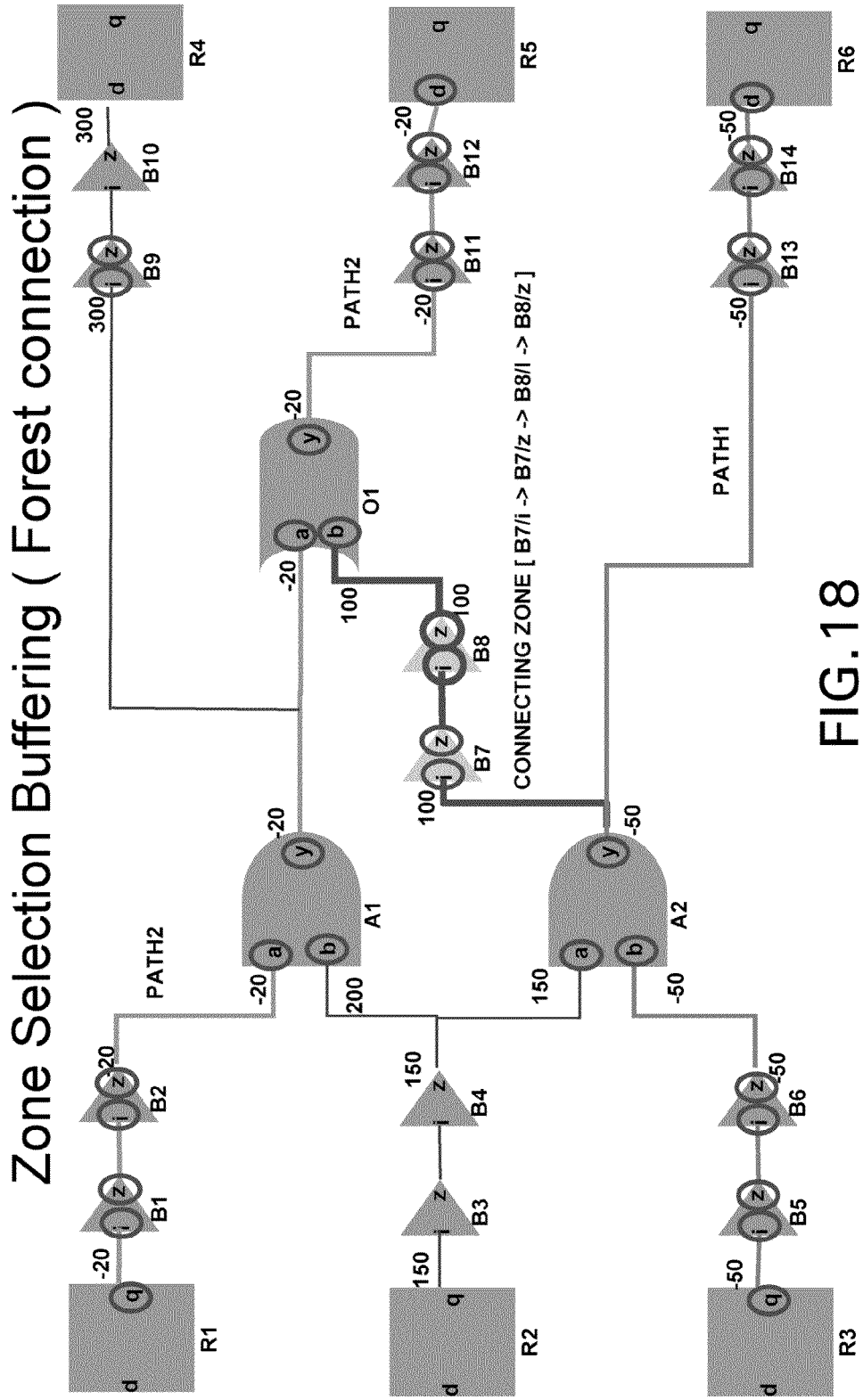

As seen in FIG. 15, two separate paths have been selected for a buffering correction to remedy a detected timing violation. The path from R1 to R6 and from R1 to R5 with two individual gates B7 and B9 are selected. However, it is noted that gate B8 is the only portion separating the two paths as gate B8 connects the two independent paths. These two paths are seen as path 1 and path 2 in FIG. 16. A forest connection exists between pin y of gate A2 and pin b of gate O1. A forest connection spanning from pin y of gate A2 to gate B7, gate B8 and arriving at pin b of gate O1 would connect path 1 to path 2. As a buffer may be inserted at pin z, as seen in FIG. 17 of gate B6, pin b of gate A2, or pin z of gate B2, the changed load resulting therefrom may not be fully seen at B8 and thus a connecting zone from B7 pin i through B7 pin z to B8 pin i to B8 pin z is included to provide a more comprehensive view of a load or slew change encountered due to corrective actions to be taken. Thus, as seen in FIG. 18, the operational timing data associated with gate B8 pins i and z are included as well to connect the two paths to give a more comprehensive affect evaluation responsive to a buffer insertion or gate resizing.

Referring back to FIG. 3, once data reduction has completed, the optimization engine 313 is executed to correct or fix timing violations determined in the ECO timing DBs 309 by, for example, insertion of a buffer or resizing of a gate along a path within an affected region of a timing violation. The optimizer engine 313 includes a suitable set of measures that it may selectively employ to fix the timing violation, each resulting in a corresponding impact on timing responsive to the selected correction. The optimizer engine 313 iterates through possible corrections to find the most optimized correction, or at least an acceptable correction. Any such sorting and traversal measures may be used. As opposed to a placement and routing implementation module separate from the signoff timing analysis module where the placement and routing implementation module generates its own timing data, herein, the optimization engine 313 may utilize the hyper-accurate timing data generated by the sign-off timing analysis module 302 such that estimations of correction in the optimization engine 313 correlate very closely with the sign-off timing analysis module 302 to thereby reduce the number of iterative loops between physical implementation placement and the actual timing analysis sign-off thereof.

Once the optimization engine 313 has completed, it will generate an ECO file 314 which includes changes to the netlist 304' including corrective recommendations for the placement and routing physical implementation module. Additionally, as the optimization engine 313 and correction module 311 in general are physically-aware, having received and investigated the physical implementation data 310 and 304' to identify a location for the placement of the buffer, resizing of the gate, or other corrective action, and therefore, the location of the corrective action is known in advance, ab initio, to be a correct, legal, valid, and non-conflicting placement of such buffer or resized gate. Thereby, the ECO file 314 may be implemented in the external physical implementation placement and routing module with relatively little difficulty. Indeed, the placement of the components performed in the optimization engine 313 may be assumed to be correct and only minor modifications of the routing amongst or interconnection amongst components may need to be modified.

Figure 4:
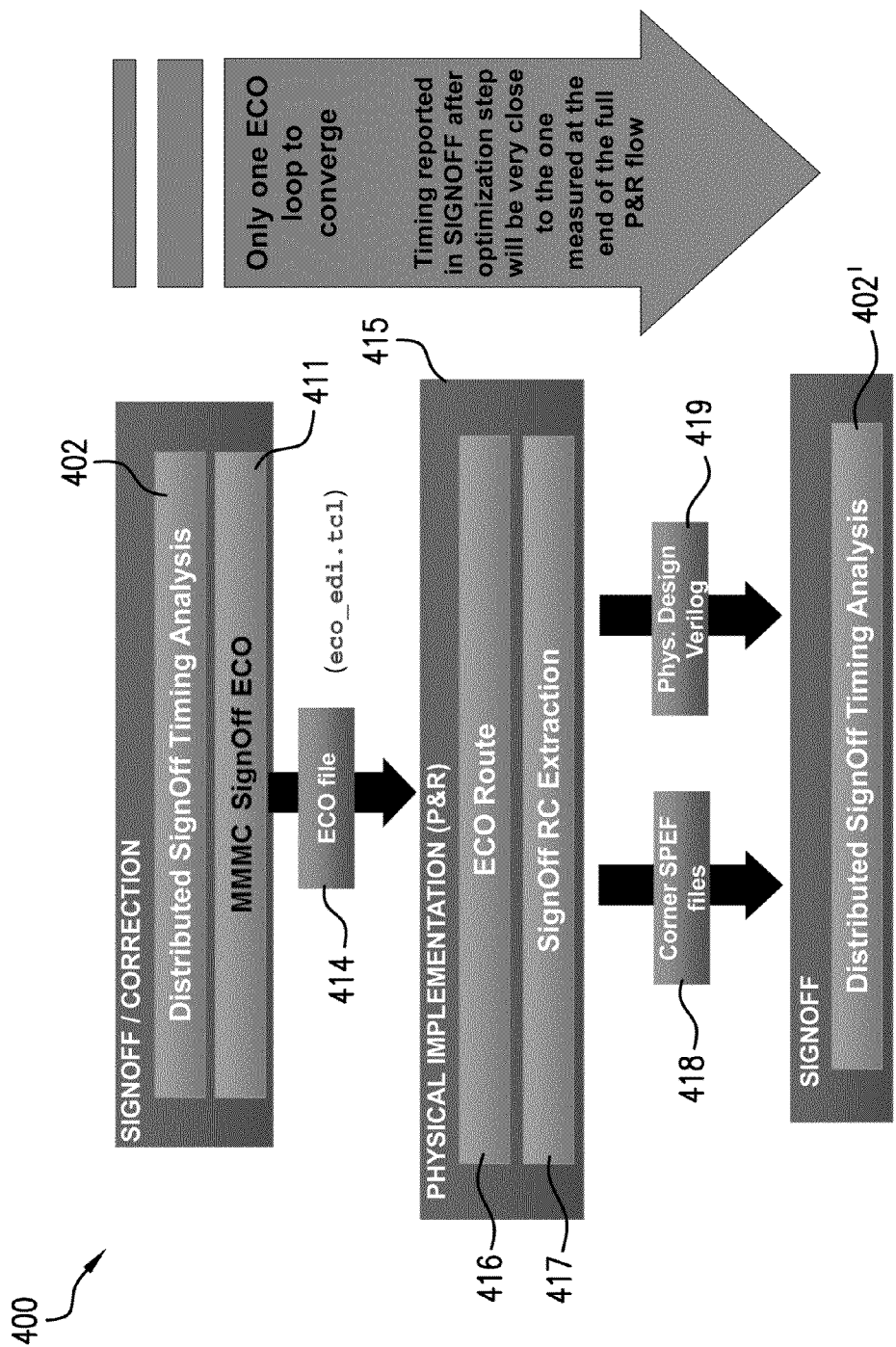
FIG. 4 is a flow diagram illustrating an enhanced expeditious single iteration signoff/physical implementation/placement and routing (P & R) flow.

As seen in FIG. 4, the timing signoff analysis module 402 is brought into close timing analysis correlation with the physical implementation ECO optimization engine 416. The single iteration signoff timing analysis and optimization flow 400 is seen to involve one ECO loop as opposed to repetitive ECO looping between the signoff timing analysis and the optimization engine. The single ECO loop is enabled due to a very close correlation of timing analysis between the timing analysis module 402 and the physically aware MMMC ECO optimizer engine 411. The optimizer engine 411 acts as a part of the correction module 412 to correct timing violations.

The distributed signoff timing analysis 402 performs a comprehensive, very accurate, and very slow timing analysis utilizing a plurality of processors to divide the processing load of views (preferably by view) amongst the processors therein. The signoff timing analysis generates an extensive amount of data which is selectively reduced based on type and based on regions of impact surrounding detected timing violations. The reduced timing data is passed on to the multi-mode multi-corner MMMC signoff engineering change order ECO optimizer—seen as correction module 411 which seeks to remedy timing violations without introducing new violations and with an eye towards the physical layout of the circuit design so as not to introduce additional conflicts.

Figure 5:
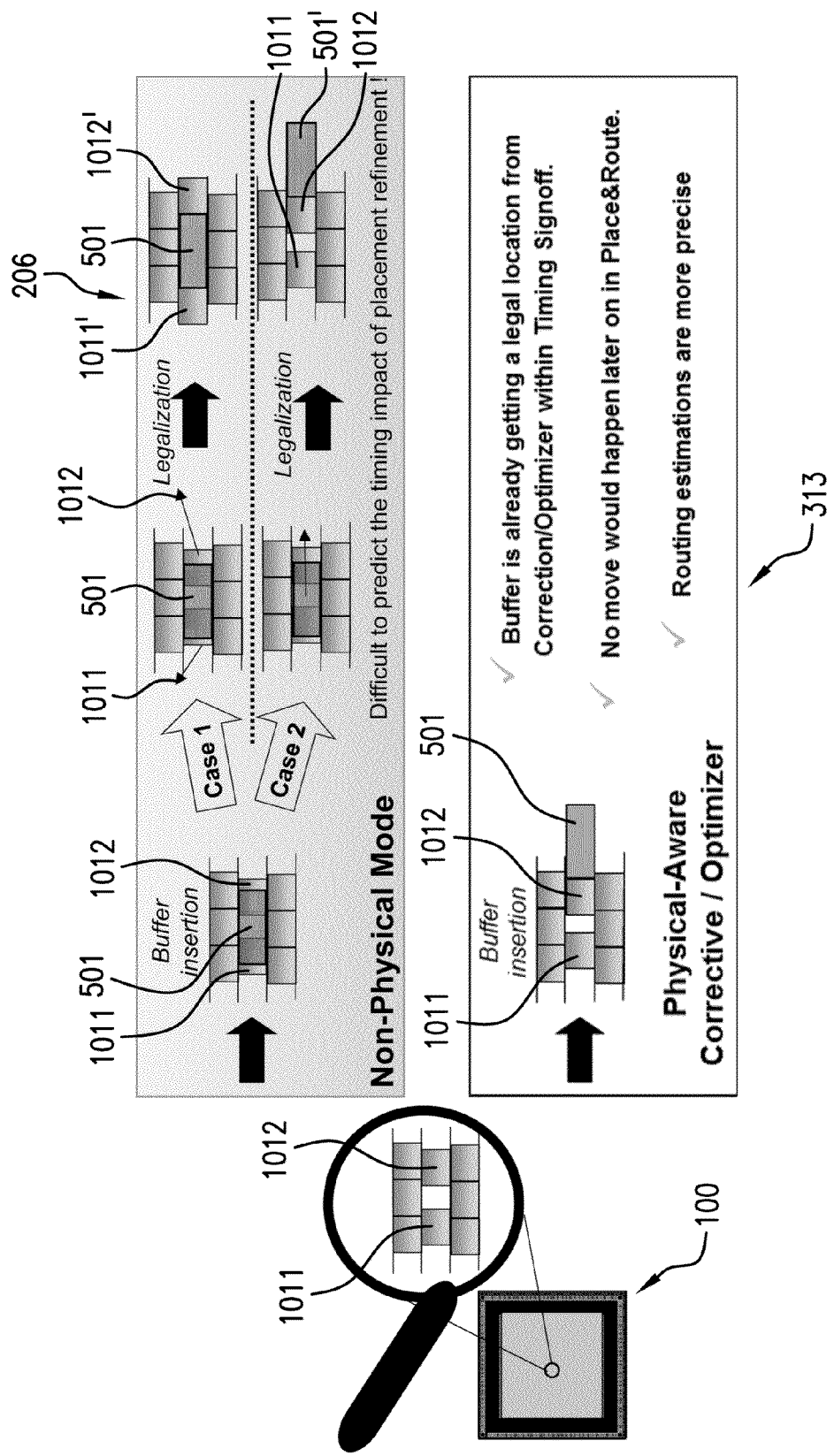
FIG. 5 is a flow diagram illustrating measures for accommodating engineering change orders (ECO) responsive to detection of a timing violation during a timing analysis of a circuit design.

Turning briefly to FIG. 5, it is seen that an exemplary corrective measure 501 is inserted in a known-good location in the physical-aware corrective optimizer at block 313. The corrective measure 501 may be, for example, an insertion of a buffer, a gate resizing, or the like, but is shown here as an exemplary buffer insertion 501 which is intelligently placed to avoid physical location conflict with any of the predefined components 1011 or 1012. In practice, such placement is much more difficult as the circuit design 100 may involve potentially hundreds of millions of gates such as gate 1011 and 1012.

Returning to FIG. 4, it is seen that once the corrective action has been taken at module 411, the engineering change order (ECO) file 414 is passed to the physical implementation placement and router (P&R) tool at block 415 where the router at block 416 implements the changes directed in the ECO file 414 which generally includes a changes to logical netlist data including changed connections of components or an insertion of a buffer therein. Upon completion of the P&R routing at block 416, the completed design is passed to the signoff RC extraction at block 417 which performs a parasitics extraction to determine changed parasitics due to inserted buffers and changed routing from the optimizer corrective module 411. Once the routing changes have been implemented at block 416 and the parasitics due to load and capacitance changes resulting from the insertion, resizing, and/or rerouting in the previous stages are accounted for, a plurality of operational corner SPEF files at block 418 and the physical design verilog at block 419 are both passed for a final round through the signoff timing analysis at block 402'. Upon completion of the final distributed signoff timing analysis 402', the design has been signed off and may proceed to actual physical fabrication to result in a physical, tangible, and usable circuit device.

FIG. 5 schematically illustrates an example of how physical-aware optimization avoids the pitfalls of non-physical aware correction heretofore seen in the art. In the illustrated example, the circuit design 100 includes a physical arrangement of components or gates, such as for example, gate 1011 and gate 1012. When attempting to correct the timing violation determined through a timing analysis of the circuit design 100, previous P&R engines have attempted to insert a buffer 501 where it is determined that they will fix the timing violation with disregard for whatever else might be there already or might be affected by such insertion. Such insertions are generally not physically-aware and do not load, identify, or avoid the components pre-existing in the physical layout of the circuit design. A problem stemming from such blind placement is that oftentimes the insertion of a corrective buffer 501 may overlap with existing components such as 1011 and 1012. In such case, when the engineering change order (ECO) is passed back to the placement and routing stage or implementation engine, it will be determined that the ECO is invalid and so a plurality of solutions will attempt to be performed. However, in correcting these problems, more problems may be introduced and a timing data between the physical implementation and the signoff timing analysis tool may wildly diverge, resulting in an almost continuous loop between the signoff timing analysis engine and the physical implementation engine.

In a first exemplary conflict case, the placement and routing or physical implementation tool may see that the buffer 501 overlaps with components 1011 and 1012 and may attempt to legalize this violation by leaving the buffer 501 in place and shifting both component 1011 and 1012 to arrive at a new location to be seen as shifted gates 1011' and 1012'. Such subsequent legalization may cause great timing problems, may violate other rules, constraints, or other such issues and result in a continuous loop between the physical implementation tool and the signoff tool.

In another case, where it is determined that the buffer 501 overlaps with components 1011 and 1012, the buffer itself may be moved, leaving components 1011 and 1012 in place and arriving at a new buffer location 501'. This creates a bouncing back and forth between tools and this is highly sub-optimal. As seen below in the physical-aware correction module or optimizer engine at block 313, the corrective buffer 501 is inserted at a known good or non-conflicting location responsive to an evaluation of a physical circuit implementation data defining the location of components 1011, 1012, . . . n. The location of all components within the circuit design is made known to the optimizer corrective module 313 located within the signoff timing tool itself.

Figure 6:
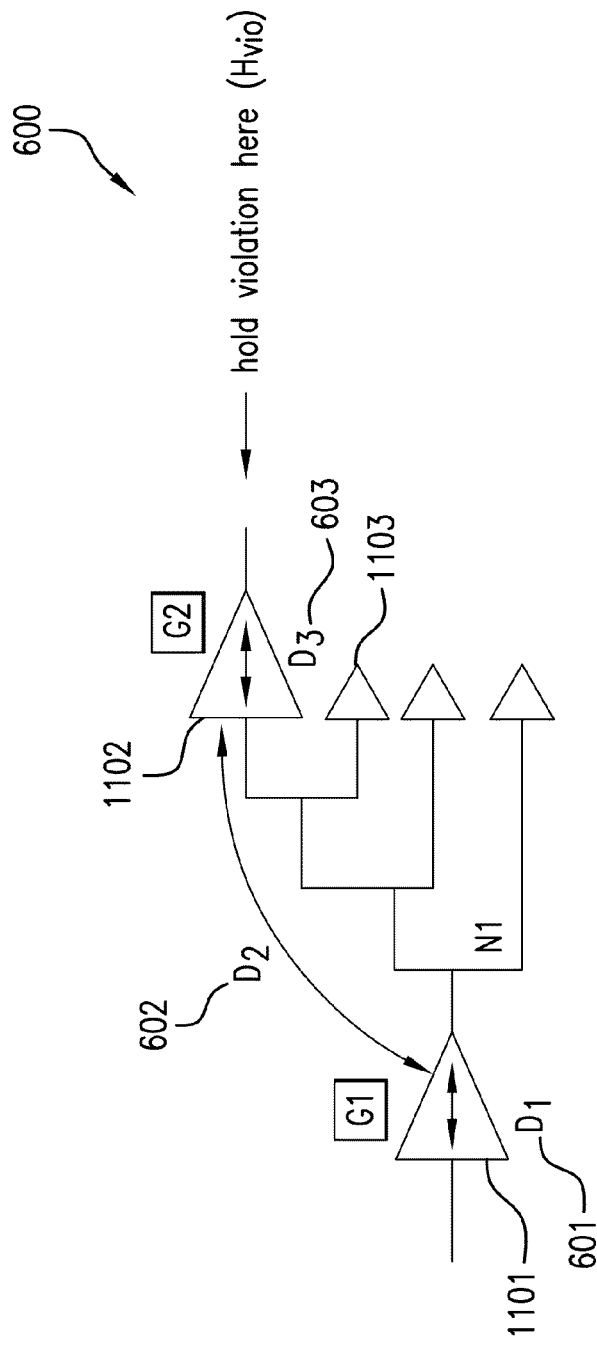
FIGS. 6-7 and 8A-8D are exemplary logical schematic timing and structural diagrams of a selected region of a circuit design illustrating stages of a timing analysis performed in conjunction with corrective action remedying detected timing violations therein to arrive at better timing engine correlation and reduced iterations between physical implementation optimizer and signoff analysis modules.

FIG. 6 schematically illustrates an example of a correction for a timing violation. In this example, the circuit portion 600 is shown, where a hold violation such as seen at gate G2 1102 is corrected by buffer insertion along the path between gate G1 and G2. Alternatively, a gate may be resized such as gate G1 1101 or gate G2 1102. In arriving at a hold violation seen at Gate 2 1102, the delay D1 601 across the gate G1 1101 is summed with a delay D2 602 for the signal to traverse from an output pin of the gate G1 1101 to an input pin of gate D2 1102. Additionally, the delay for the signal to traverse from the input pin of gate G2 1102 to the output pin of G2 1102 is summed as well to arrive a total path delay of D1+D2+D3 to arrive at the hold violation $H_{VIO}$.

Figure 7:
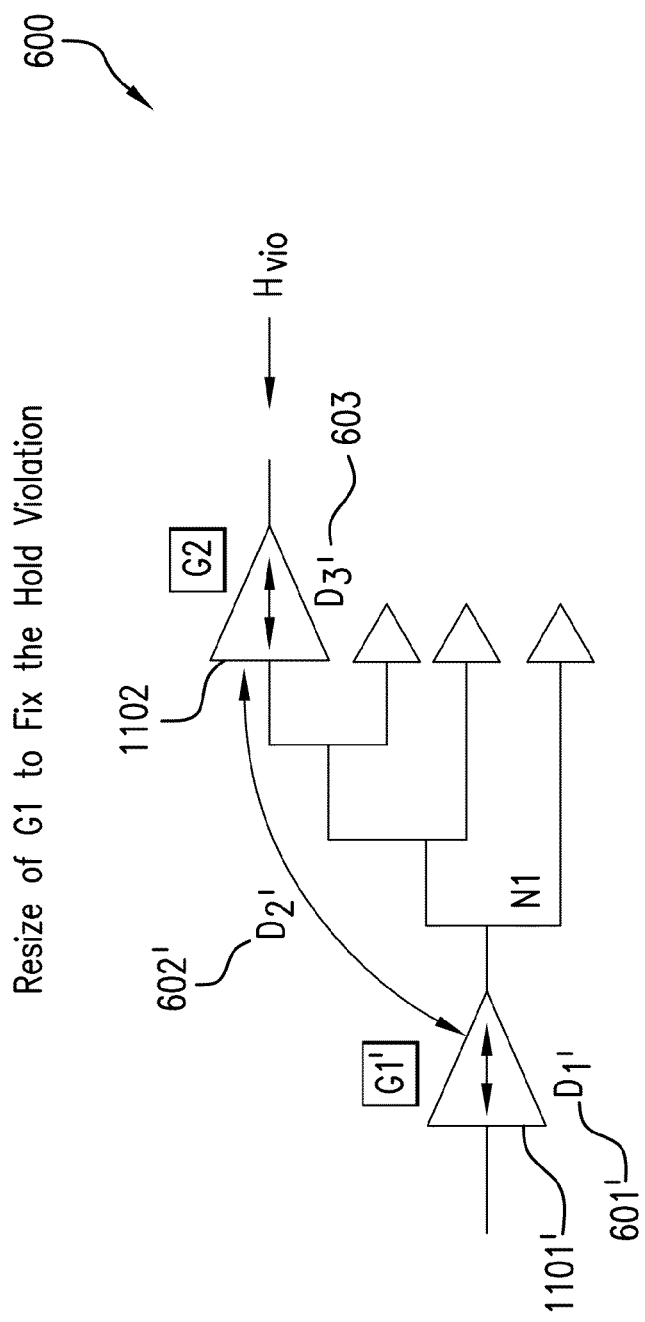

FIG. 7 shows a resizing operation of gate G1 to correct the hold violation. Gate G1 1101 is resized to be gate G1' 1101' by increasing the size of the buffer. Increasing the size of a gate or buffer results in a greater delay which is generally used to resolve a hold violation. Resizing gate G1 1101 to be gate G1' 1101' results in a corresponding change in delay $D_1$' 601'. The delays throughout the net or path have changed with $D_1$' 601' representing the delay of gate G1' 1101'. A delay $D_2$' 602' is a new delay between gate G1' 1101' and G2 1102. Gate G2 1102 remains the same and thus it is shown in its original form; however, the delay and/or load may have changed due to parasitics, change in capacitance, load, and other such factors, and it is now represented as gate or delay $D_3$' 603'. It is seen that all three delays $D_1$', $D_2$', and $D_3$' all change depending on signoff or implementation timer, the optimization timer of D1 for example will not equal the signoff timing calculated for D1. To reach an acceptable timing correlation between the optimization engine and the signoff timing analysis engine, the change in hold violation is computed to be a sum of Deltas, or as seen below, $\Delta D_1 + \Delta D_2 + \Delta D_3$ which equals $(D_1'-D_1)+(D_2)-(D_2)+(D_3'-D_3)$. In other words, the initial delays subtracted from the change delay to arrive at the Delta or change of each delay along each stage. Once each of changed delays have been computed, then a summation is made. This is a highly simplified Figure showing this and it should be noted that a path through the circuit may comprise many different components rather than merely the two with a direct patch shown therebetween as seen in exemplary FIG. 7.

Figure 8A:
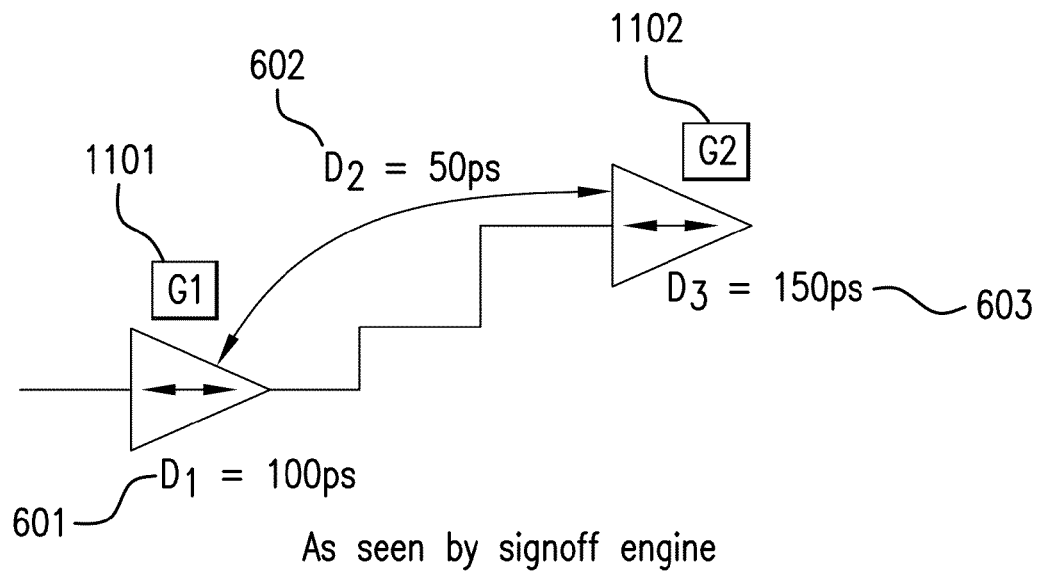
Figure 8B:
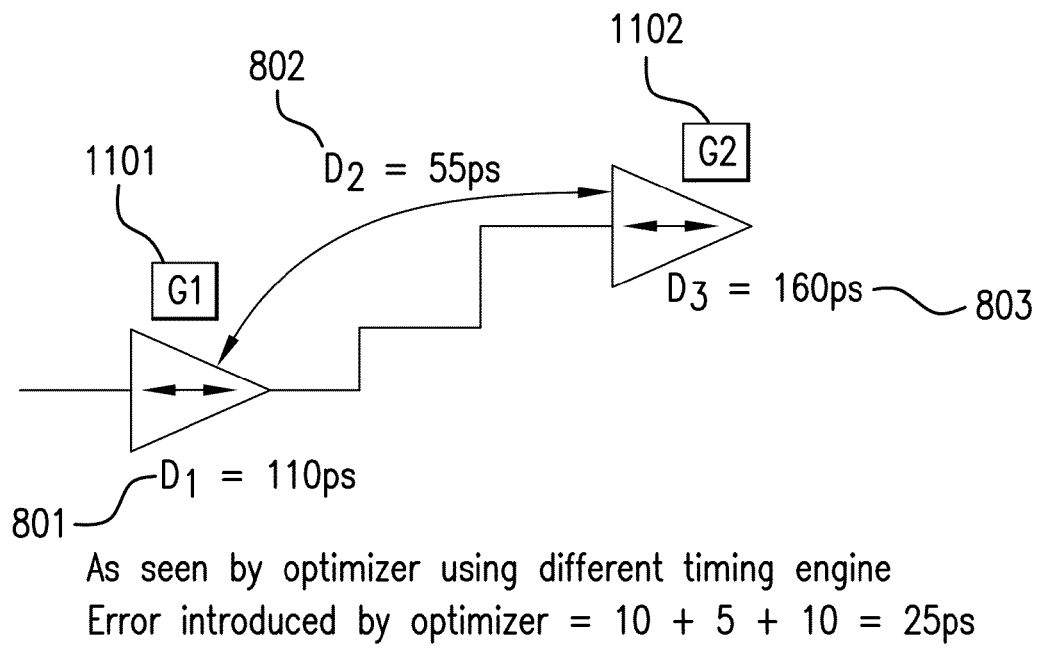

As seen in FIG. 8A, the delays are calculated by a very accurate, very slow signoff timing analysis engine where the delay $D_1$=100 picoseconds for gate G1 1101, the delay between gates G1 1101 and G2 1102 is seen to be a delay $D_2$ 602 to equal 50 picoseconds, and the delay $D_3$ 603 is seen to be 150 picoseconds for gate G2 1102. In contradistinction, and as seen in FIG. 8B, the timing as seen by the placement and routing optimizer utilizing a different timing engine may be very different. The gate G1 1101 is determined to have a delay $D_1$ 801 of 110 picoseconds. The delay $D_2$ 802 between gates is seen to be 55 picoseconds. Finally, the delay of gate G2 1102 is seen to be delay $D_3$ 803 160 picoseconds. This is due to the very different timing nature of the placement and routing optimizer which may not be as comprehensive and exhaustive as the signoff timing engine and thus may be biased more a more pessimistic or optimistic but faster and less timing therein. As a result, the error introduced by the placement and routing optimizer is equal to 10+5+10 which equals 25 picoseconds. This number is arrived at through delay D1 801 minus delay D1 601, so 110 picoseconds minus 100 picoseconds equals 10 picoseconds. The delay D2 at 55 picoseconds minus 50 picoseconds as seen in block 802 and block 602 arrives at a 5 picosecond difference. Lastly, the delay D3 803 equals 160 picoseconds minus the delay D3 603 of 150 picoseconds to arrive at a 10 picosecond difference for a total summation of 25 picoseconds. While 25 picoseconds is not a great timing divergence, this minor miscorrelation of timing data between the placement routing module and the signoff timing analysis module may lead to, in aggregate with other computations, multiple iterations between signoff and physical implementation modules and a very suboptimal process.

Figure 8C:
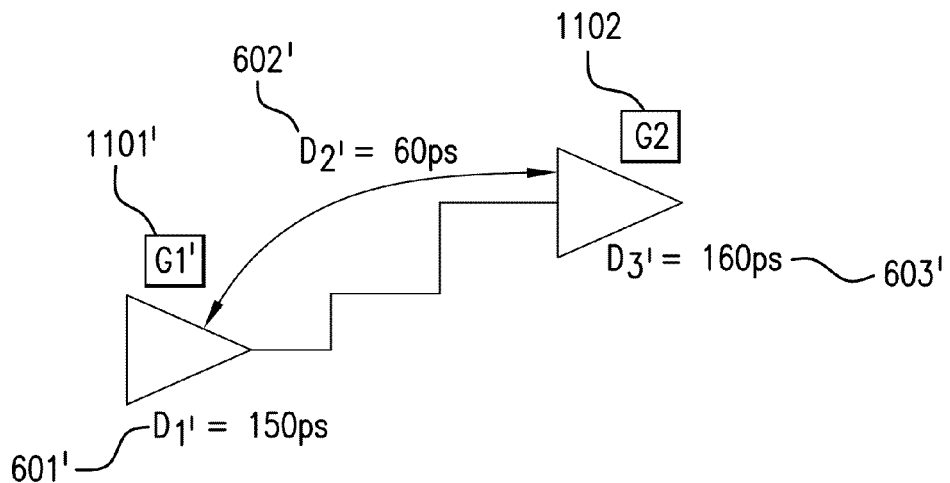

As seen in FIG. 8C, the simplified logical schematic 600 as seen by the timing analysis signoff engine following a resizing of gate G1 1101 to gate G1' 1101' is seen. The hold violation change is calculated to be the change in delay $D_1$ 601 plus the change in delay of delay $D_2$ 602 plus the change in delay $D_3$. In other words, the initial delay $D_1$ is subtracted from the changed delay $D_1$' summed with the delay $D_2$ subtracted from the $D_2$' plus the $D_3$ subtracted from $D_3$'. This arrives at for the first $D_1$ instance 150 picoseconds minus 100 picoseconds to arrive at a 50 picosecond $\Delta D_1$; 60—50 to arrive at a 10 picosecond change for $D_2$; and 160 picoseconds —150 to arrive at 10 picosecond $\Delta D_3$. Summing all of $\Delta D_1$ plus $\Delta D_2$ plus $\Delta D_3$ arrives at a 70 picosecond actual hold violation change due to the resizing of gate G1' 1101'.

Figure 8D:
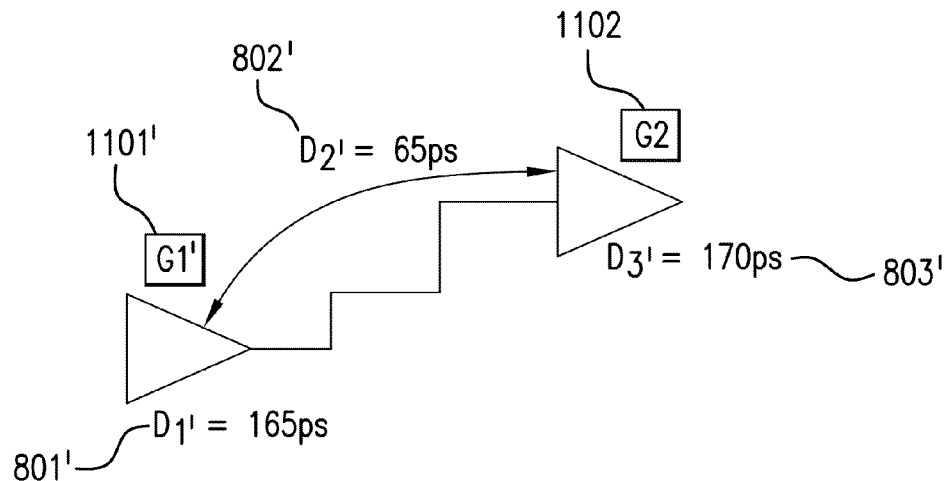

In FIG. 8D, the same correction implemented upon the logical schematic to remedy the timing violation is seen through the eyes of the optimizer engine rather than the signoff engine. In other words, the change in timing due to the correction is calculated using optimizer functions as opposed to signoff calculation functions. The optimizer computes the sum of Deltas by subtracting out the initial 110 picoseconds of delay $D_1$ from $D_1$' (165—110 to equal 55 picoseconds), which is the difference or Delta between $D_1$' 801' and $D_1$ 801. Next, $D_2$ is subtracted from $D_2$' 802' (65 ps minus 55 ps equals 10 ps) for a Delta $D_2$ equals 10 picoseconds. Lastly, $D_3$ 160 ps is subtracted from $D_3$' 170 picoseconds 803' to arrive at 10 picoseconds $\Delta D_3$. Summing $\Delta D_1 + \Delta D_2 + \Delta D_3$ arrives at a total of 75 picoseconds slack. So, the error introduced by the optimizer module is calculated as: the 75 picoseconds determined by the optimizer minus 70 picoseconds determined by the signoff timing analysis tool to arrive at a 5 picosecond divergence between signoff timing module and optimizer engine of the correction module. This computation of the Deltas or the relative change, as opposed to the absolute change, allows for a much closer timing correlation between the optimizer engine of the correction module with the signoff timing analysis module. Such increased correlation between timers may drastically reduce the number of iterations between the two modules, and is result in a reduced iteration ECO loop implementation.

The optimization engine of the correction module seeks to fix all hold violations in the design while not introducing any new setup violations and not introducing any new design or rule violations while also minimizing the number of netlist changes such as a buffer insertion. The optimization engine of the correction module preemptively prescribes a corrective physical modification and location therefor responsive to timing violations detected in the reduced timing data prior to generating and sending an ECO change order to an external physical implementation P&R unit. The optimization engine is imparted with knowledge of physical implementation data for the circuit design and a focused signoff timing data representing only timing violating portions, regions affected by the timing violation as well as any corrective modifications therefor, and types of timing data relevant to prescribing corrective action. The optimization engine iterates through each timing violation simulating and estimating potential fixes therefor. The optimization engine further weights and sorts known timing violations and potential fixes therefor. Potential fixes that are more beneficial at resolving violations as opposed to creation of new violations are identified and located on the circuit design in a known-good location and an ECO is generated for prescriptive transmission to the external physical implementation P&R unit.

Figure 19:
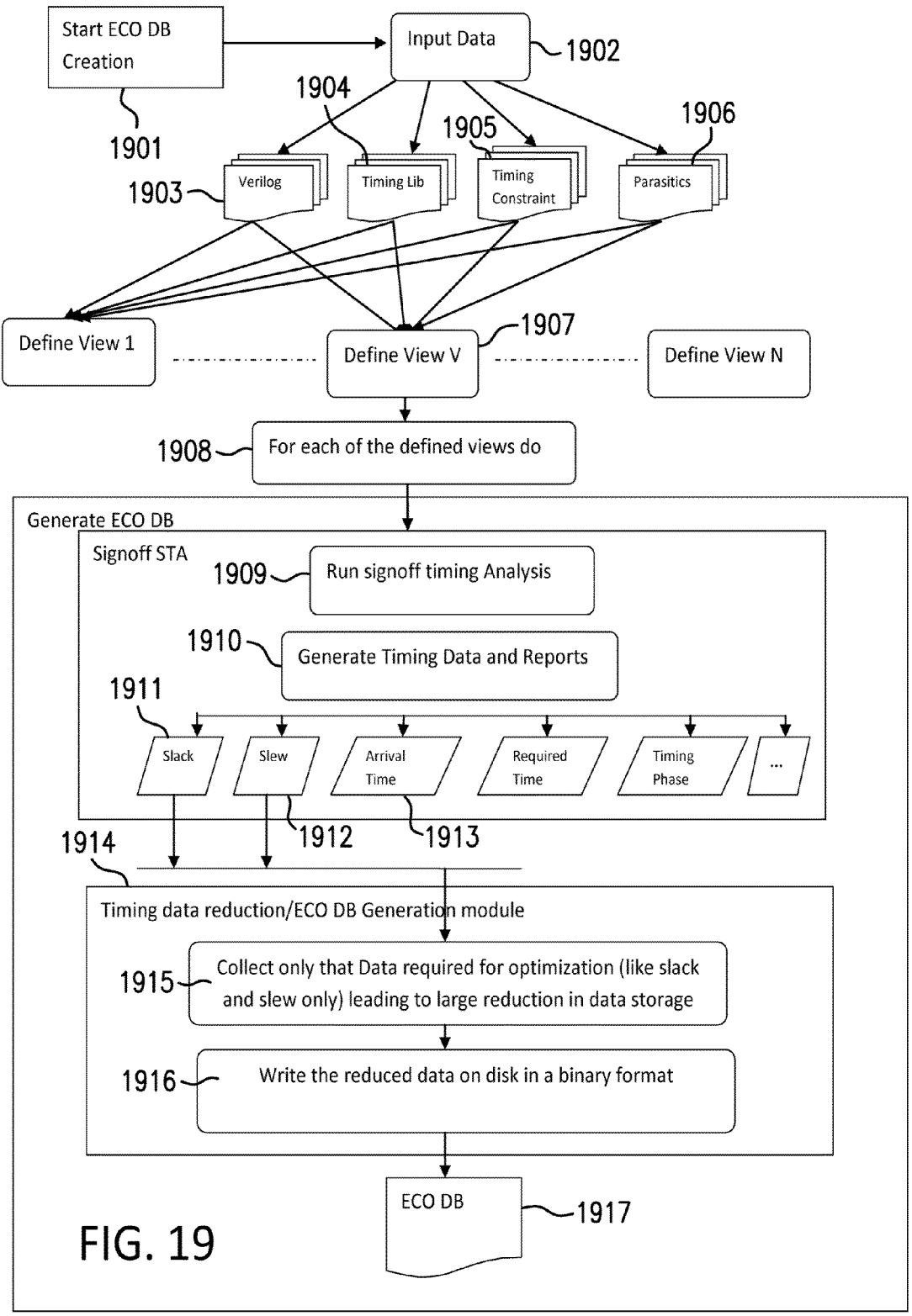
FIG. 19 illustrates an exemplary Engineering Change Order (ECO) timing database generation and data reduction flow in accordance with an exemplary embodiment of the present invention.

FIG. 19 illustrates a preparation for execution of the optimization engine where at least one exemplary ECO timing database is generated to be later used by the optimization engine at subsequent stages of the flow. At block 1901, the ECO timing database (DB) creation is started. A plurality of input data sources are retrieved at block 1902 including, for example, a verilog netlist 1903 defining at least logical components and nets interconnecting components; a timing library (lib) 1904, timing data 1905, parasitics 1906, Advanced On Chip Voltages (AOCV) data, Multi Source Variation (MSV), and the like. The plurality of data sources imported at block 1902 are utilized to define a plurality of views at block 1907 where a view is a unique combination of operational corner and mode expected to be encountered by the physical circuit device defined by the circuit data. For each of the defined views established at block 1907, an ECO timing DB is generated at block 1918. Each ECO DB generated at block 1918 is the result of an execution at block 1909 of a signoff timing analysis for the particular view (corner, mode). Signoff timing analysis 1909 executes while a journaling operation records results of the signoff timing analysis 1909 to generate timing data and reports 1910. Such timing data and reports generate potentially tens to hundreds of types of timing data including, for example: Slack data 1911, Slew data 1912, Arrival time 1913, Required Time, Timing phase, and the like.

Of the generated timing data and reports, and as seen at block 1914 and 1915, only those types that may be relevant to detected violations and their prescribed corrective physical manipulations are selectively extracted to generate the ECO timing DB. In other words, only those types of data that may be compatible with the corrective optimizer in arriving at physical corrective modifications are selectively extracted. As an illustrative example, to correct a Hold Violation—slack data 1911 and slew data 1912 may be selectively extracted as they may be utilized in the optimization engine to estimate effects of possible corrective physical modification towards remedying timing violations. For another type of timing violation or other violation type, a different set of data types may be utilized.

At block 1916, the data types selected for extraction based upon relevancy to the timing violation and/or the prescribed corrective physical modification are written to a storage location to store the ECO timing DB which is a light weight, reduced, or compressed ECO timing DB. In a preferred embodiment, such information is written in a binary data format, though any suitable data format type may be employed.

Figure 20:
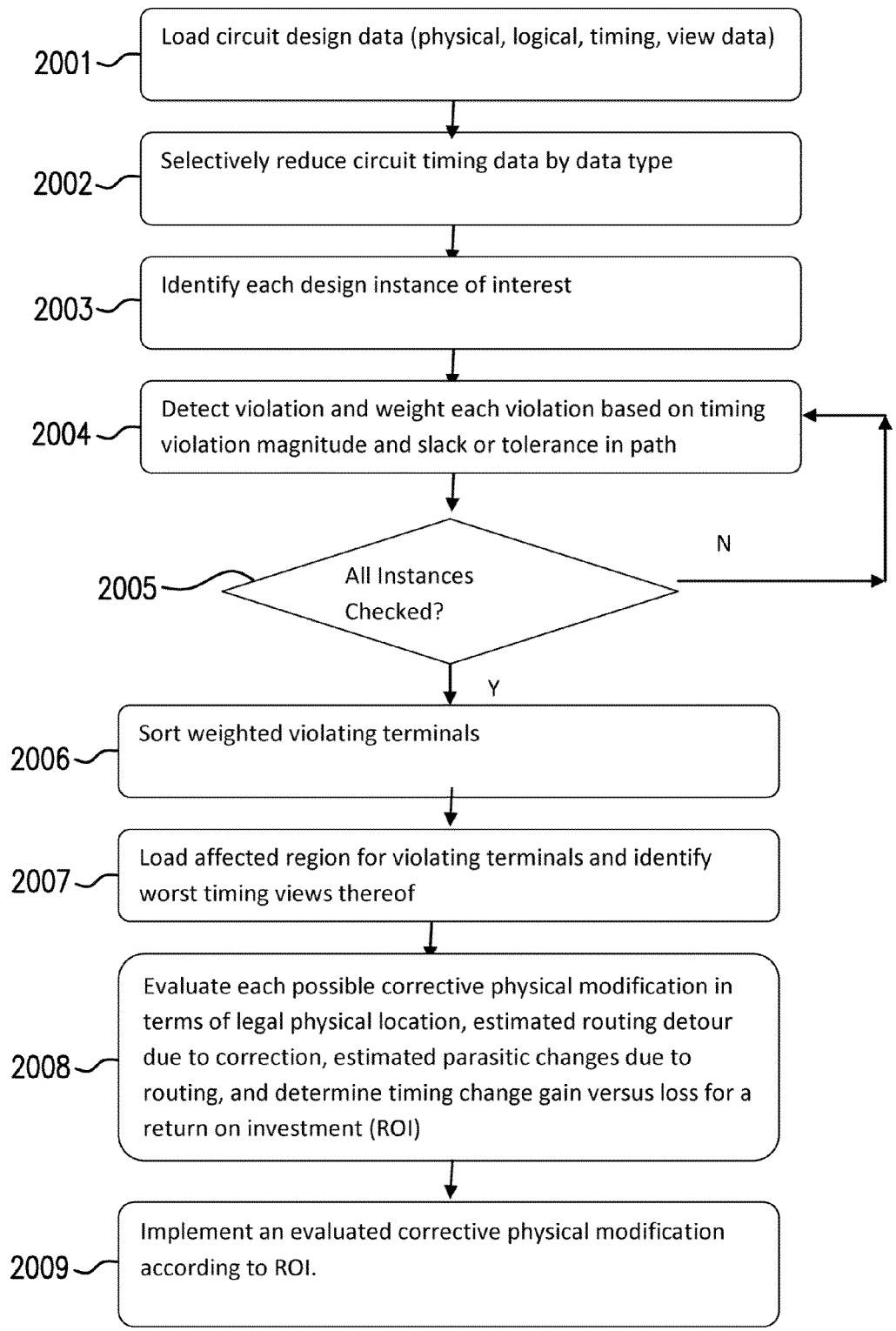
FIG. 20 illustrates an exemplary optimization/correction engine flow in accordance with an exemplary embodiment of the present invention; and, FIG. 21 illustrates an exemplary arrangement of a hardware configuration of the data optimization module and ECO generation in accordance with an exemplary embodiment of the present invention.

An exemplary correction/optimization flow is illustrated at FIG. 20. At block 2001, the circuit design data is loaded. The circuit design data includes physical implementation data—such as, for example: a layout; a logical circuit design data—such as, for example: a schematic or netlist (such as a verilog, HDL, VHDL, or the like); circuit operational timing data (reduced according to type of data usable for optimization/correction); and view data establishing the operational modes and corners tested.

At block 2002, timing violations are determined in the timing data and regions of impact including components affected by the timing violation (or prescriptive physical corrective modification thereof) are identified and grouped as seen in exemplary FIGS. 9-18. Such components or terminals thereof with timing violations and the defined regions are selectively extracted to form reduced timing data for optimization/correction to operate upon.

Each instance of interest, such as time violating terminals, components thereof, components within the affected region, and the like are selectively identified at block 2003. At block 2004 each of the instances of interest identified at block 2003 are evaluated to determine violation, magnitude of the violation, and susceptibility to corrective action with relation to its affected region. For example, the timing slack of the affected region or path which the time violating component belongs is evaluated. If, for example, the magnitude of timing slack or tolerance is large, then a larger number of possible prescriptive corrective physical manipulations may be possible to remedy the timing violation. A repetitive loop iterates between blocks 2004 and 2005 until all instances have been evaluated and the decision block 2005 is affirmative.

Upon affirmative determination that all instances have been evaluated at block 2005, flow proceeds to block 2006 where the weighted violating terminals are sorted according to the weight of the timing violation (or other such violation) and the ability to correct the violation. At block 2007 the regions of impact for the violating terminals are loaded into memory and the worst timing views thereof are identified. In other words, the plurality of views (corner and mode combinations) are evaluated to determine the worst-case scenario view of the timing violation for the affected region.

At block 2008 a set of possible corrective physical modifications for the timing violation are evaluated one by one to find an optimal (or at least acceptable modification). A plurality of predetermined factors are employed to arrive at the selected corrective physical modification, such as, for example: does a legal physical location in the physical implementation data exist in light of already placed components?; what is the estimation of routing changes needed to be made to the physical implementation data of the circuit design to accommodate the legal location?; what are the estimated parasitic changes due to the routing changes?; and a return on investment (ROI) is determined by evaluating what the timing change gains versus losses are.

Lastly, at block 2009, the ROIs of the evaluated physical corrective modifications are compared one to another according to ROI and one is chosen to be prescribed to the external physical implementation placement and router.

Figure 21:
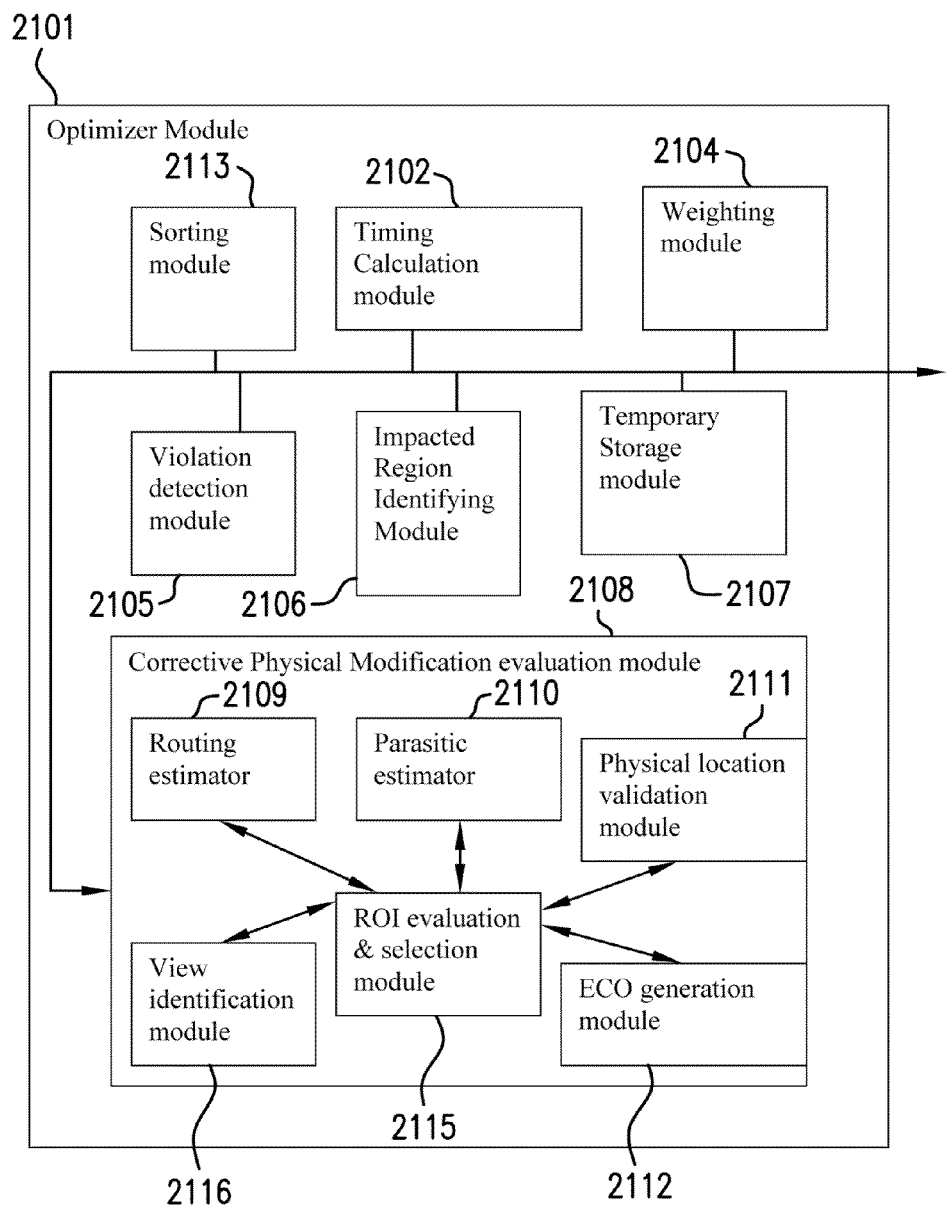

An exemplary optimizer module is illustrated in FIG. 21. While an exemplary interconnection amongst modules is illustrated as a bus, any suitable interconnection measures may be employed such as, for example, dedicated connectors between components, and the like. As seen, an optimizer module 2101 includes a violation detection module 2105 employed to detect timing violations, such as, for example, by determining the negative value of timing data for instances, gates, components, or pins. An affected region identifying module 2106 is executed responsive to the detection of a violation to determine a subnetwork of affected components to define a region of impact based upon the timing violation thereof. According to the determined region of impact, subnetwork of block 2106, the timing data output from a timing analysis module (as seen in FIGS. 3 and 19) is selectively reduced.

A timing calculation module 2102 executable to calculate candidate physical corrective modification delay change is provided. The timing calculation module 2102, in an exemplary embodiment, utilizes a sum of changed delay times responsive to selected physical corrective modification of the circuit design. Such timing calculation module 2102 subtracts initial delay timing (as determined by the timing analysis module) from corrected delay times to arrive at changed delay—which is used to calculate ROI and estimate the external physical implementation placement and routing unit's timing analysis to correlate closely therewith and reduce the number of iterative loops thereto.

The optimizer module 2101 further includes a weighting module 2104 executing to weigh timing violations by considering the magnitude of delay and the timing slack of the signal path within the affected region including the time violating terminal or component therein. The sorting module 2113 is executable to sort weighted timing violations received from the weighting module 2104. Such sorted timing violations may be temporarily stored in the temporary storage module 2107; additionally, any module may employ the temporary storage module 2107 which is, in an exemplary embodiment, a flash memory device, hard drive unit, or Dram memory, however any storage device suitable to store timing data and physical circuit design data may be used.

The view identification module 2116 loads the regions of impact of timing data for each view to identify a worst-case view thereof. Each (or at least a subset) of the possible physical corrective modifications of the circuit design are evaluated by the physical location validation module 2111 executing to identify a legal or valid location in the physical implementation data of the circuit design for corrective physical modification thereof to correct a timing violation. For example, the physical location validation module 2111 determines a location for a corrective buffer insertion or gate resize along the path of the affected region having the determined timing violation thereon. The possible corrective modifications are evaluated by the routing estimator module 2109 to determine likely routing changes necessary to accommodate each of the possible valid physical locations determined by the physical location validation module 2111. The parasitic estimator 2110 estimates parasitics, such as capacitance, crosstalk, and the like introduced by each of the possible routing changes. The ROI evaluation/select module 2115 evaluates timing gain versus losses where losses may include, for example, timing losses, induced violations, resultant increased parasitics, and the like. The evaluation is responsive to outputs from the evaluative execution of blocks 2111, 2109, 2110, and the like. A sorting module 2113 (or a sorting module integral to module 2108) executes to selectively determine an acceptable (or optimal if available) physical corrective modification for the circuit design. Lastly, ECO generation module 2112 is executed to generate an Engineering Change Order (ECO) to prescriptively convey a corrective action, such as, for example, by providing an updated netlist including a newly inserted corrective buffer at circuit design location (x,y,z) to remedy a hold violation therein. Such ECO is provided to an external physical implementation placement and routing unit for actual implementation thereof.

A more detailed description of an exemplary optimization portion flow begins by loading logical design data such as the verilog information along with the physical implementation data such as a physical layout file, preferably contained in a .def or .lef file though any suitable file for containing physical component geometries, arrangements, interconnections, and coordinate placement may be used. The timing views enabled for optimization are extracted and provided such as in a .lib, .sdc, or a .cdb file type, or the like, to the optimization engine though any suitable file type may be used. The ECO timing database is loaded and reduced (as described above in greater detail) to contain only types of timing information needed for an optimization process and only those portions affected by timing violation identified therein and regions of impact surrounding the timing violation. For each instance (i) in the design, an outer processing loop is executed. An inner loop within the outer instance loop considering each terminal (t) of the instance (i) is executed to determine whether terminal t has a hold violation. If t does not have a hold violation, then the next terminal is evaluated. If, however, the terminal does have a hold violation, or a timing violation thereon determined by the sign (negative/positive) of the delay time, then the terminal's unique identifier, canonical location, or other such identifier, is stored in a violating list V. Additionally, the weight (magnitude of delay) of the terminal's violation is found by a function including factors such as the amount of the hold violation, the availability of the setup slack, and the like. Such factors are considered to define the effectiveness of corrective action at these terminals.

Upon completion of evaluation of all terminals, the next instance is evaluated and its terminals are each, in turn, evaluated. All of the terminals of all of the instances are evaluated and then all of the terminals found to be violating in the violating list V are sorted, preferably, based upon the weight or magnitude of the timing of the violation based on the factors discussed above and other suitable factors.

Following the sorting operation, the original hold/setup slack timing will be setup as a variable: slack (initial setup) and slack S (initial hold). The region or sub-network that would be affected when the terminal is buffered is identified and collected for inclusion in the reduced timing graphs. All of the sink terms (terminals logically driven by a net) or T sinks of the net connected to the terminal t are collected within this region as well as instances of the terminals of the T sinks. Such an exemplary collection can be seen in FIG. 10. A setup and hold sub-network within the identified region is created and the identity of the worst setup and hold views for the terminal are identified respectively as V setup and V hold. A buffer insertion in front of the terminal for both V setup and V hold is evaluated. Firstly, the initial delays are stored and the sub-network delay calculation for setup and hold views V setup and V hold are executed. The initial delays D init (setup) and D init (hold) for all the arcs in the sub-network are stored. For each available buffer (BUF), a legal physical buffer location within the physical implementation data is identified. If there are no legal locations for such a buffer, then the process is aborted. Otherwise, the routing detour that would occur when connecting the buffer to the legal location is estimated. The parasitic changes that would occur due to the routing detour are estimated, the buffer is inserted, and the parasitics in the sub-network are virtually adjusted therefor. The sub-network delay is calculated with the buffer therein and the final delays DFIN(BUF, setup) and DFIN(BUF, hold) are stored as final delays for all the arcs in the sub-network. The timing gain is then evaluated by doing a sum of Deltas of delays as discussed earlier with connection to FIG. 6.

The hold gain is checked by calculating hold gain to equal the sum of the initial hold delay minus the final hold delay including the buffer in the path. If the hold gain is greater than zero (which is bad for a hold violation), execution continues and the next buffer is evaluated. To check the setup loss, the setup loss is calculated to equal the sum of the initial delay minus the final delay including the buffer in the path. If the setup loss is less than zero (which is bad for setup and slack) (initial, setup) and the setup loss is less than zero, means that a new setup violation has occurred and consequently, a next buffer is evaluated.

The return on investment of the correction of the buffering move is calculated as equal to gain over loss equals hold gain divided by a function including a setup loss and area of the buffer as factors or parameters thereto, though additional factors or parameters may be included as well. The next buffer is then evaluated until all buffers have been evaluated. All of the buffering move potentials are sorted and stored in a database, though any suitable storage may be used, and sorted therein by terminal based upon a return on investment to arrive at a more optimal solution.

For each sorted buffering move, the active non-worst view V setup and V hold is determined by performing the steps in the evaluate buffer insertion in front of the terminal for V setup and V hold and checking to see if the move is acceptable for these views. If the move is not acceptable for these views, then the move is rejected and execution proceeds to the next move. This is performed for all of the potential buffering moves for terminal t and this is also performed iteratively for all of the terminals. The buffering moves are sorted in collected terms of return on investment and the buffering moves are accepted and implemented based upon the sorted return on investment list for the most optimal buffering insertions.

Although this invention has been described in connection with specific forms and configurations thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flow of processing steps may be reversed or interposed, all without departing from the spirit or scope of the invention as defined in the appended Claims.

What is claimed is:

1. A physically-aware timing signoff system for detecting and responsively prescribing physical corrections for timing violations in an electronic circuit design defined by physical implementation data, the system comprising:
    a timing analysis module receiving physical implementation data generated and optimized in timing by a placement and routing implementation tool, said timing analysis module executing operational timing analysis according to a plurality of predefined operational views the physical implementation data, said timing analysis module identifying a defective portion of the physical implementation data responsive to detection of an operational timing defect in any of the operational views, said timing analysis module generating timing data including, for the operational views, the identification of each said defective portion detected therein;
    a data reduction module coupled to said timing analysis module, said data reduction module defining, for each said defective portion, a region of the physical implementation data identified to be impacted by corrective action within a selectable parametric node depth thereof, said data reduction module selectively extracting a portion of the timing data corresponding to each said region of the physical implementation data to generate reduced timing data; and,
    a signoff correction module coupled to said data reduction module to execute an optimization engine on the reduced timing data and prescribe a corrective physical modification upon a corresponding one of said regions of physical implementation data, said correction module generating and transmitting a change order for at least one operational timing defect to the placement and routing implementation tool, the change order including said corrective physical modification for updated physical implementation of the electronic circuit design.

2. The system as recited in claim 1, wherein said data reduction module further selectively extracts predetermined types of timing data responsive to a determination of utility for optimization of the circuit design, whereby types of timing data compatible with said signoff correction module are extracted to generate reduced timing data.

3. The system as recited in claim 1, wherein said data reduction module includes a timing map generator executable to correlate physical implementation data with corresponding timing data.

4. The system as recited in claim 3, wherein said generated change order includes an Engineering Change Order (ECO) file output by said signoff correction module and readable by the placement and routing implementation tool, wherein said ECO file includes a specified physical location within said circuit design for said corrective physical modification, said specified physical location being determined in advance of ECO generation to not conflict with other components in said electronic circuit design.

5. The system as recited in claim 4, wherein said signoff correction module calculates an operational timing violation for at least one of said regions according to a sum of changes of timing characteristics at each component along said region based on said corrective physical modification, said signoff correction module thereby substantially correlating time determinations with a timing analysis portion of the placement and routing implementation tool and said timing analysis module.

6. The system as recited in claim 1, wherein said data reduction module executes to selectively determine a region of impact surrounding said defective portion according to a predetermined node depth from said defective portion.

7. The system as recited in claim 1, wherein said signoff correction module receives the physical implementation data including placement and logical component data for the circuit design and said change order being based upon a predetermined set of factors including an evaluation of a plurality of candidate corrective modifications to the physical implementation data.

8. A physically-aware timing signoff method for detecting and responsively prescribing physical corrections for timing violations in an electronic circuit design defined by physical implementation data, the method comprising:
    receiving the physical implementation data generated and optimized in timing by a placement and routing implementation tool;
    executing timing analysis in at least one processor to analyze the physical implementation data in operational timing according to a plurality of predefined operational views of the physical implementation data, said timing analysis identifying a defective portion of the physical implementation data responsive to detection of an operational timing defect in any of the operational views, said timing analysis generating timing data including for the operational views the identification of each said defective portion detected therein;

setting a parametric node depth for a region considered to be impacted by corrective action responsive to said identification of said defective portion;

executing data reduction to define for each said defective portion a region of the physical implementation data identified to be impacted by corrective action within said parametric node depth, said data reduction selectively extracting a portion of the timing data corresponding to each said region of the physical implementation node to generate reduced timing data; and, executing corrective optimization on the reduced timing data to prescribe for each operational timing defect a corrective physical modification upon a corresponding one of said regions of physical implementation data, said corrective optimization generating and transmitting a change order for at least one operational timing defect to the placement and routing implementation tool, the change order including said corrective physical modification for updated physical implementation of the electronic circuit design.

9. The method as recited in claim 8, wherein said data reduction executes to further selectively extract predetermined types of timing data responsive to a determination of utility for optimization of the circuit design, whereby types of timing data compatible with said corrective optimization are extracted to generate reduced timing data.

10. The method as recited in claim 8, wherein said data reduction executes a timing map generation to correlate physical implementation data with corresponding timing data.

11. The method as recited in claim 8, wherein said generated change order includes an Engineering Change Order (ECO) file output by a signoff correction module and readable by the placement and routing implementation tool, wherein said generation of said ECO file specifies a physical location within said circuit design for said corrective physical modification, said specified physical location being determined in advance of ECO generation to not conflict with other components in said electronic circuit design.

12. The method as recited in claim 8, wherein said data reduction executes to selectively determine a region of impact surrounding said defective portion according to a predetermined node depth from said defective portion.

13. The method as recited in claim 8, wherein said corrective optimization receives the physical implementation data including placement and logical component data and said change order being based upon a predetermined set of factors including an evaluation of a plurality of candidate corrective modifications to the physical implementation data.

14. The method as recited in claim 8, including actuating said corrective optimization to calculate an operational timing violation for at least one of said regions according to a sum of changes of timing characteristics at each component along said region based on said corrective physical modification to thereby substantially correlate time determinations from a placement and routing timing analysis of the placement and routing implementation tool and said timing analysis performed during signoff.

15. A method for detecting and responsively transforming in physically-aware manner a circuit design defined by physical implementation data to implement physical corrections for detected violations in the circuit design, the method comprising:

establishing at least one processor coupled to a memory, the memory including physical implementation data for a circuit design;

executing signoff timing analysis in at least one processor to receive the physical implementation data generated and optimized in timing by a placement and routing implementation tool and analyze the physical implementation data in operational timing according to a plurality of predefined operational views of the physical implementation data, said signoff timing analysis identifying a defective portion of the circuit design responsive to detection of an operational timing defect in any of the operational views, said signoff timing analysis generating signoff timing data including an identification of each defective portion detected therein;

setting a parametric node depth for a region considered to be impacted by corrective action responsive to said identification of said defective portion;

executing data reduction to define for each said defective portion a region of the circuit design identified to be impacted by corrective action within said parametric node depth, said data reduction selectively extracting a portion of the signoff timing data corresponding to each said region of the circuit design to generate reduced signoff timing data; and, executing corrective optimization based on the reduced signoff timing data to implement at least a first portion of a corrective physical modification to said circuit design for each operational timing defect determined therein and transmitting a change order to the placement and routing implementation tool, the change order including an indication of at least a second portion of the corrective physical modification to said circuit design.

16. The method as recited in claim 15, wherein said data reduction further executes to selectively extract predetermined types of signoff timing data responsive to a determination of utility for optimization of the circuit design, whereby types of signoff timing data compatible with said corrective optimization are extracted to generate reduced signoff timing data.

17. The method as recited in claim 15, wherein said processor executes a timing map generator to correlate physical implementation data of said circuit design with corresponding signoff timing data.

18. The method as recited in claim 17, further comprising identifying a physical location within said circuit design for said corrective physical modification, said identified physical location being determined to not conflict with other components in said circuit design based upon said physical implementation data.

19. The method as recited in claim 15, further comprising determining said region of impact surrounding each said operational timing violation to a predetermined node depth from said operational timing violation.

20. The method as recited in claim 15, further including calculating a timing violation for at least one of said regions according to a sum of changes of timing characteristics at a set of component terminals along said region based on said corrective physical modification.

21. The method as recited in claim 15, further comprising actuating a physical circuit device fabrication unit to physically fabricate a circuit device embodying the circuit design defined by the physical implementation data.

22. The method as recited in claim 15, wherein said corrective physical modification is selected from the group consisting of: inserting a physical buffer and physically transforming a gate to a different physical dimensionality thereof.

23. The method as recited in claim 15, further comprising determining a non-conflicting location in said circuit design defined by said physical implementation data for said corrective physical modification based upon the reduced signoff timing data and the physical implementation data.

24. The method as recited in claim 15, further comprising locating a component in said timing data unaffected by a timing violation and outside said regions, and incorporating said located component in said reduced timing data to thereby connect one of said regions with another of said regions.

* * * * *

UNITED STATES PATENT AND TRADEMARK OFFICE
CERTIFICATE OF CORRECTION

| | | |
|---|---|---|
| PATENT NO. | : 8,875,082 B1 | Page 1 of 1 |
| APPLICATION NO. | : 13/729665 | |
| DATED | : October 28, 2014 | |
| INVENTOR(S) | : Sourav Kumar Sircar and Manish Garg | |

It is certified that error appears in the above-identified patent and that said Letters Patent is hereby corrected as shown below:

On the title page, the "Assignee" item (73) should read as follows:

-- Cadence Design Systems, Inc., San Jose, CA (US) --

Signed and Sealed this
Twenty-ninth Day of September, 2015

Michelle K. Lee
*Director of the United States Patent and Trademark Office*